(12) United States Patent
Wilkinson

(10) Patent No.: US 7,037,042 B2
(45) Date of Patent: May 2, 2006

(54) DEVICE AND METHOD FOR LAYING AND JOINING PIPE

(75) Inventor: Ivan R. Wilkinson, Emmett, ID (US)

(73) Assignee: Trenchcraft, Inc., Boise, ID (US)

( * ) Notice: Subject to any disclaimer, the term of this patent is extended or adjusted under 35 U.S.C. 154(b) by 0 days.

(21) Appl. No.: 11/004,554

(22) Filed: Dec. 3, 2004

(65) Prior Publication Data

US 2005/0123356 A1 Jun. 9, 2005

Related U.S. Application Data

(60) Provisional application No. 60/528,318, filed on Dec. 8, 2003.

(51) Int. Cl.
*F16L 1/028* (2006.01)

(52) U.S. Cl. .................... 405/184; 405/174; 405/154.1

(58) Field of Classification Search ................ 405/184, 405/174–183, 154.1, 157
See application file for complete search history.

(56) References Cited

U.S. PATENT DOCUMENTS

| | | | | |
|---|---|---|---|---|
| 3,034,668 A | * | 5/1962 | Wicks | 414/508 |
| 3,565,269 A | * | 2/1971 | Martin | 405/177 |
| 3,858,731 A | * | 1/1975 | Briggs | 29/781 |
| 3,956,901 A | * | 5/1976 | Brown | 405/184.5 |
| 4,094,152 A | * | 6/1978 | Jutte | 405/184 |
| 4,274,758 A | * | 6/1981 | Schosek | 405/184 |
| 4,362,435 A | | 12/1982 | Henry | 405/154 |
| 4,571,122 A | | 2/1986 | Yamamoto et al. | 405/184 |
| 4,682,912 A | | 7/1987 | Henry | 405/154 |
| 4,741,646 A | | 5/1988 | Hatch | 405/175 |
| 5,174,685 A | | 12/1992 | Buchanan | 405/179 |
| 5,219,265 A | | 6/1993 | Recker | 414/731 |
| 5,232,502 A | | 8/1993 | Recker | 118/317 |
| 5,368,413 A | | 11/1994 | Moore | 405/154 |
| 5,452,969 A | | 9/1995 | Crook | 405/303 |
| 5,522,699 A | | 6/1996 | Smith | 405/154 |
| 5,707,175 A | | 1/1998 | Geelhoed | 405/180 |
| 5,795,101 A | | 8/1998 | Bill | 405/154 |
| 6,318,952 B1 | | 11/2001 | Waggoner | 414/745.4 |
| 6,540,095 B1 | | 4/2003 | Haringer | 212/242 |
| 6,543,551 B1 | | 4/2003 | Sparks et al. | 175/52 |

\* cited by examiner

*Primary Examiner*—Frederick L. Lagman
(74) *Attorney, Agent, or Firm*—Joseph W. Holland; Holland & Midgley, LLP

(57) ABSTRACT

An auto-advancing pipe installation device and a method for laying consecutive lengths of bell and spigot pipe. The auto-advancing pipe installation device installs sequential lengths of pipe in a trench. The auto-advancing pipe installation device includes a locomotion system adapted for advancing engagement within the trench, a pipe feed system, a pipe alignment system and a pipe joining system. The pipe feed system positions a pipe length on a forward section of the pipe alignment system. The pipe alignment system aligns the forward pipe length with a rearward pipe length positioned in a pipe alignment system rearward section. The pipe joining system applies a force to a first end of the forward pipe length as a pipe restraint applies a restraining force against the rearward pipe length, joining the forward and rearward pipe lengths.

16 Claims, 16 Drawing Sheets

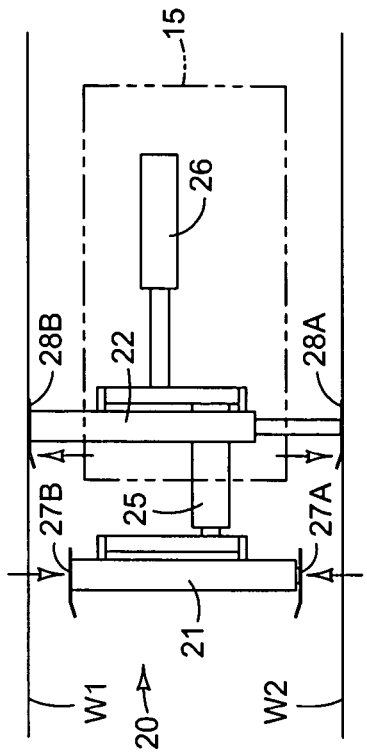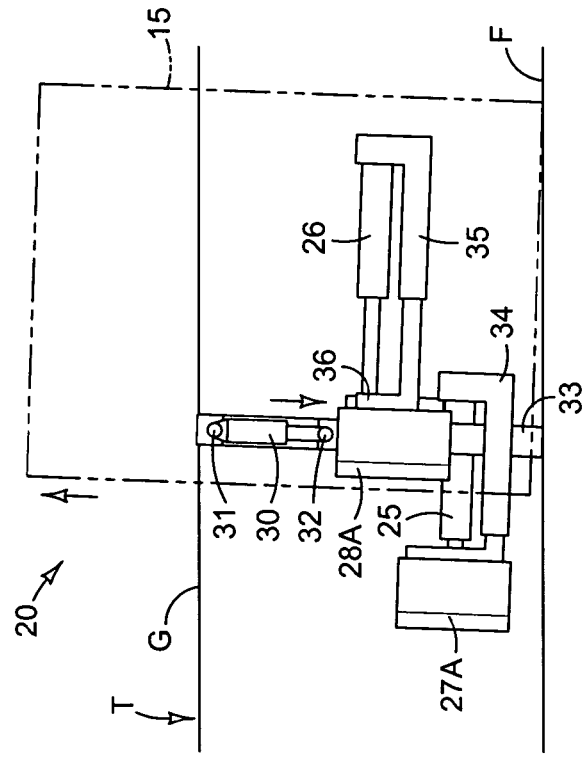
FIG. 13A
FIG. 13B
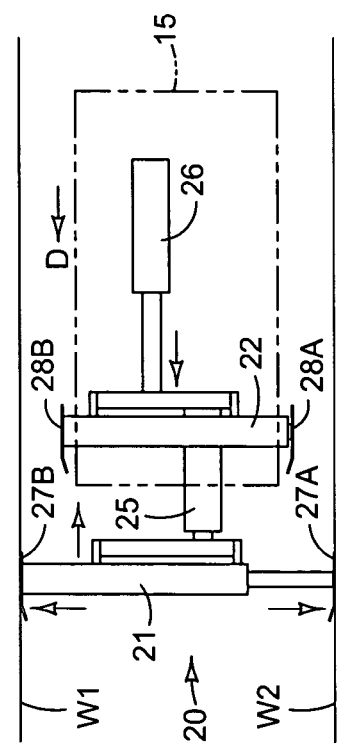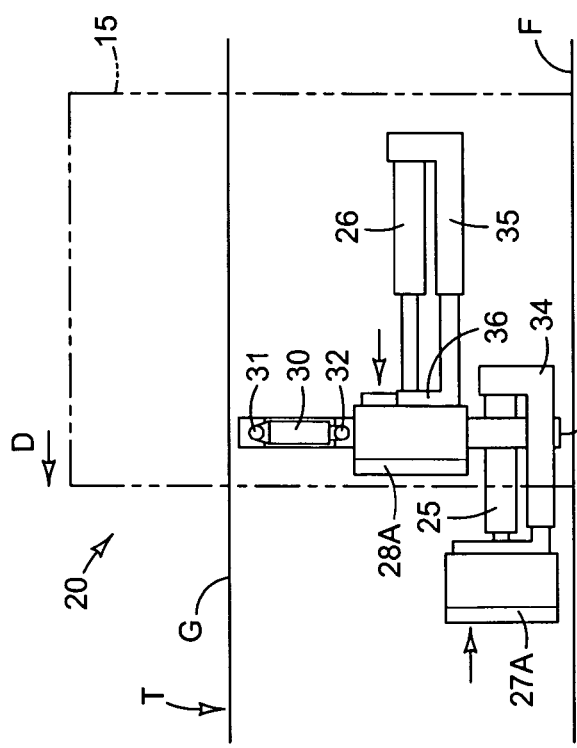
FIG. 14A
FIG. 14B

DEVICE AND METHOD FOR LAYING AND JOINING PIPE

The present application claims benefit to a provisional application, Ser. No. 60/528,318, filed on Dec. 8, 2003, entitled Automated Pipe Laying Device, which is incorporated by reference herein.

BACKGROUND OF THE INVENTION

1. Technical Field

The present invention relates generally to devices for laying pipe and, more specifically, to a device that is capable of auto-advancement, laying and joining pipe.

2. Background of the Invention

The process of laying sections of pipe for an underground pipeline involves the excavation of a trench to a desired depth followed by placement and positioning of pipe in the trench. When a bell and spigot pipe is being installed, the lengths are typically joined by applying mechanical pressure to a most recently laid section of pipe in order to engage the spigot end of that length with the bell end of a previously laid length. This method involves placing one or more workers in the trench to guide a lowered section of pipe into contact with a previously installed section. The workers must also disengage rigging from the pipe that was used in lowering the length into the trench. Once a pipe length is positioned in the trench, it is manually joined to a preceding pipe length. In deep trenches, a work crew commonly works within the confines of a trench shoring box that provides increased safety in the trench working condition.

Excavation and placement functions are typically performed by a single piece of equipment, an excavator. The excavator is a relatively costly piece of equipment, often track mounted, that performs primarily an excavation function. One disadvantage of the current popular method is the fact that a costly piece of equipment is oftentimes moved between tasks, excavation and pipe installation, that may otherwise proceed at different rates. Additionally, where shoring is required it is often moved along the length of the trench by the excavator as the pipeline advances requiring yet a third function or task of the excavator.

Devices, including excavators that position or otherwise place pipe at the bottom of a trench, pose a number of disadvantages. These devices are positioned outside the trench and typically place pipe by maneuvering along a top edge of the trench over tailings that have been placed alongside the trench during excavation. These surfaces are rarely, if ever, flat and therefore make the task of placement more difficult. Additionally, activity at grade level, depending on soil conditions, may increase a probability of trench collapse.

Advantage may therefore be found in providing an auto-advancing device that is capable of laying and joining pipe in a trench. Additional advantage may be found in providing an apparatus that auto-advances along a pre-excavated trench, laying and joining pipe in the trench. Additional advantage may be found in providing a method for advancing a device for feeding, laying and joining pipe along a trench. Advantage may also be found in providing a pipe installation device that is capable of auto-advancing along the floor of an excavated trench by engagement with at least one surface of the trench selected from a group of trench surfaces including a floor and two generally opposing sidewalls defining the trench.

SUMMARY OF THE INVENTION

The present invention is directed to an auto-advancing pipe installation device for installing sequential lengths of pipe in a trench that includes a frame and a locomotion system connected to the frame. The locomotion system is adapted for advancing engagement with the trench. The auto-advancing pipe installation device also includes a pipe alignment system and a pipe feed system, both connected to the frame, the pipe alignment system is positioned to receive a forward pipe length from the pipe feed system onto a pipe alignment system forward section, the pipe alignment system adapted to align the forward pipe length with a rearward pipe length positioned in a pipe alignment system rearward section. The auto-advancing pipe installation device also includes a pipe joining system connected to the pipe alignment system, a pipe restraint adapted to selectively restrain the rearward pipe length against rearward movement, the pipe joining system adapted to apply a force to a first end of the forward pipe length, the force being substantially parallel to a longitudinal axis of the forward pipe length, joining the forward pipe length to a restrained rearward pipe length.

In the preferred embodiment, the locomotion system of the auto-advancing pipe installation device includes a first travel ram connected to the frame, the first travel ram adapted for linear extension and retraction in a line substantially parallel to a direction of travel of the auto-advancing pipe installation device and a second travel ram connected to the frame, the second travel ram adapted for a substantially simultaneous opposing linear retraction and extension with respect to the linear extension and retraction of the first travel ram. The locomotion system also includes a first anchor ram connected to and movable with the extension and retraction of the first travel ram, the first anchor ram including a first pair of opposing side anchor plates connected to and movable with opposing ends of the first anchor ram and a second anchor ram connected to and movable with the extension and retraction of the second travel ram, the second anchor ram including a second pair of opposing side anchor plates connected to and movable with opposing ends of the second anchor ram. The first anchor ram is adapted for extension upon completion of the linear extension of the first travel ram and retraction upon completion of the linear retraction of the first travel ram. Similarly, the second anchor ram is adapted for extension upon completion of the linear extension of the second travel ram and retraction upon completion of the linear retraction of the second travel ram.

In the preferred embodiment, the auto-advancing pipe installation device includes a pipe supply system, including a pipe cradle adapted to hold a supply of pipe, a pipe feed chute adapted to receive a single pipe length from the pipe cradle and a pipe feed ram for advancing the single pipe length from the pipe feed chute from a first position wherein the pipe is supported in the pipe feed chute to a second position wherein the pipe is supported by the pipe feed system.

In the preferred embodiment, the pipe joining system of the auto-advancing pipe installation device includes a pipe seating ram adapted to exert a force to an end of a pipe length positioned in the pipe alignment system forward section, the force substantially parallel to a longitudinal axis of the pipe length positioned in the pipe alignment system forward section. The force exerted by the pipe seating ram is adjustable so that various pipe diameters may be accommodated and so that sufficient force is applied to insert a spigot end of the forward pipe length into the bell end of the rearward or trailing pipe length. Ideally, the force applied should be sufficient to overcome the resistance of a gasket positioned in a gasket race of the bell to insertion of the spigot end, but not so great so as to "bottom out" the spigot in the bell.

The present invention is also directed to a method for laying consecutive lengths pipe using an auto-advancing pipe installation device including the steps of advancing the auto-advancing pipe installation device along the length of the trench by engaging at least one surface of the trench selected from a group of trench surfaces including a floor and two generally opposing sidewalls defining the trench, to a selected position, feeding a pipe length onto a forward section of a pipe alignment system, aligning the pipe length with a previously laid pipe length positioned on a rearward section of the pipe alignment system, restraining the previously laid pipe length against rearward movement, joining the pipe length in the forward section of a pipe alignment system by exerting a force substantially along a longitudinal axis of the pipe length in the forward section of a pipe alignment system and consequently against the previously laid pipe length positioned in the rearward section of the pipe alignment system so that a spigot end of one of the pipe length in the forward section of a pipe alignment system engages a bell end of the pipe length positioned in the rearward section of the pipe alignment system. Once the pipe length in the forward section of a pipe alignment system and the pipe length positioned in the rearward section of the pipe alignment system are joined, restraint of the pipe length positioned in the rearward section of the pipe alignment system is discontinued and forward travel of the self-advancing auto-advancing pipe installation device resumes. A joined pipe length including the pipe length positioned in the forward section of a pipe alignment system and the pipe length positioned in the rearward section of the pipe alignment system are deposited at a rear end of the auto-advancing pipe installation device as the auto-advancing pipe installation device resumes its forward travel.

The present invention consists of the parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIGS. 9 through 14 are schematic side view representations depicting a preferred embodiment of a locomotion system of an auto-advancing pipe installation device according to one embodiment of the present invention;

DETAILED DESCRIPTION

Figure 1:
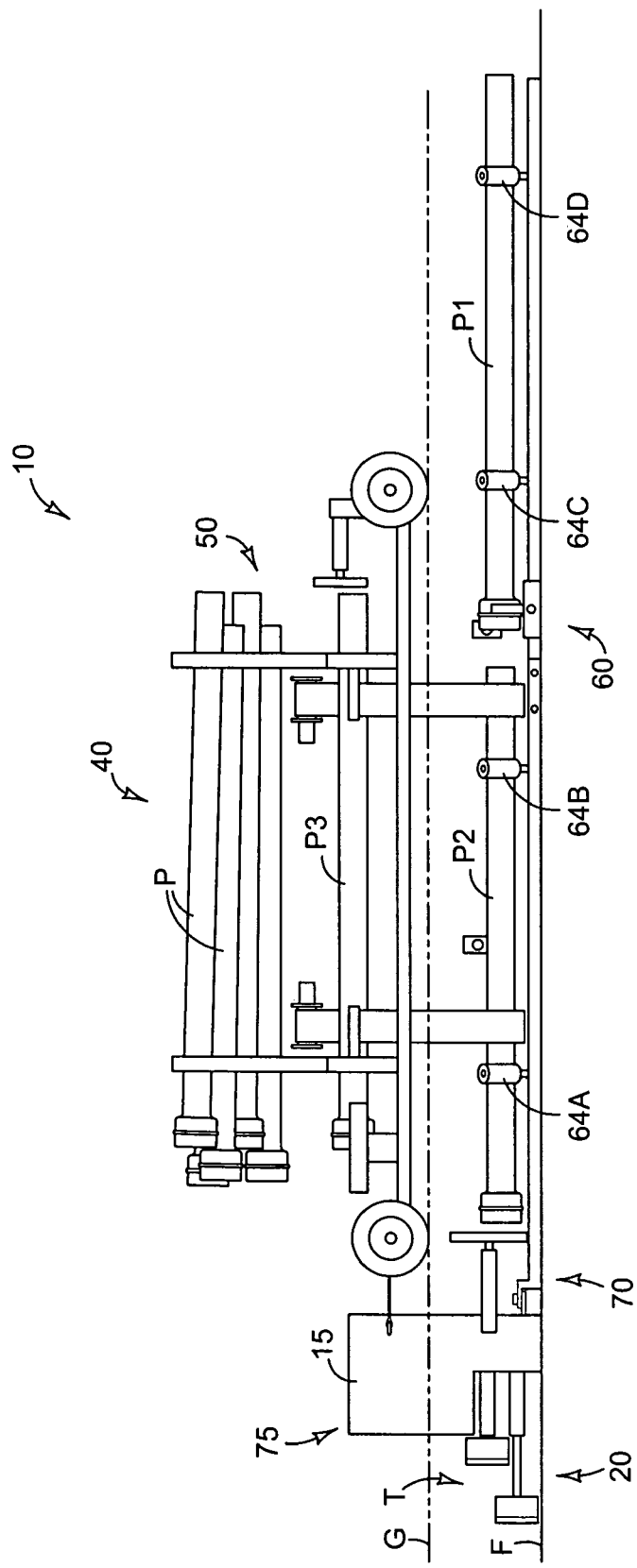
FIGS. 1 through 6 are schematic side view representations depicting a preferred embodiment of an auto-advancing pipe installation device according to a preferred embodiment of the present invention.
Figure 5:
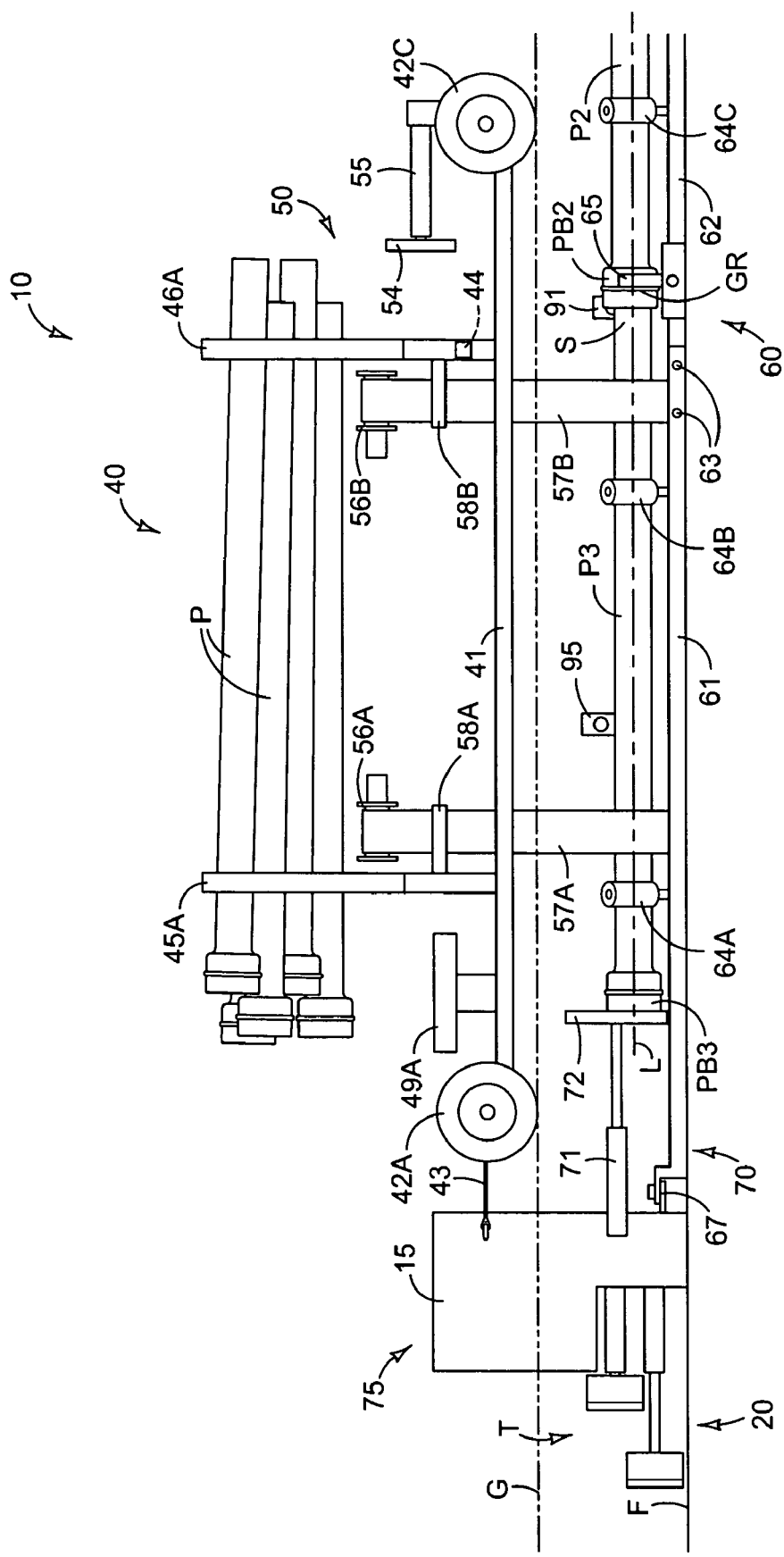
Figure 6:
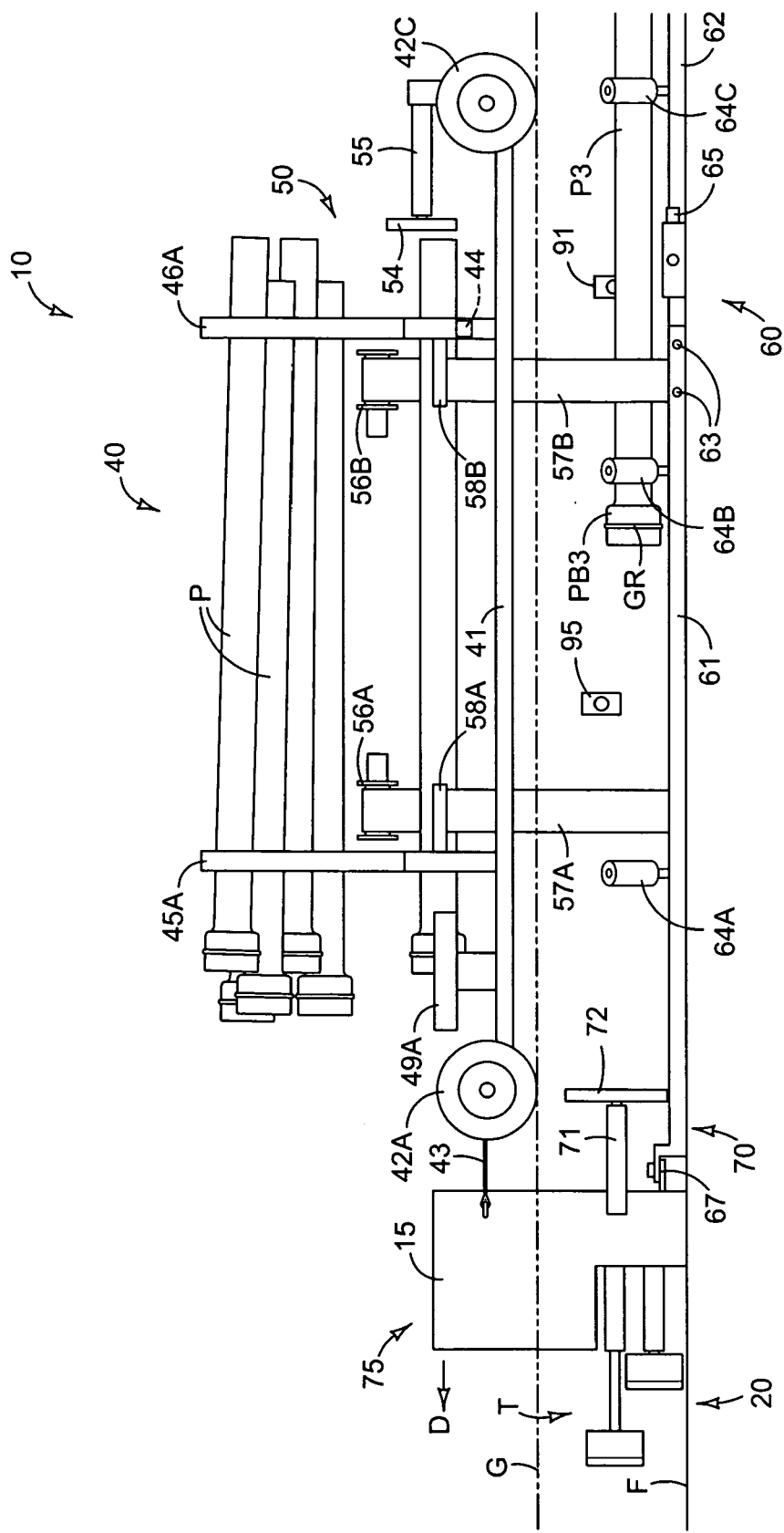
Figure 7:
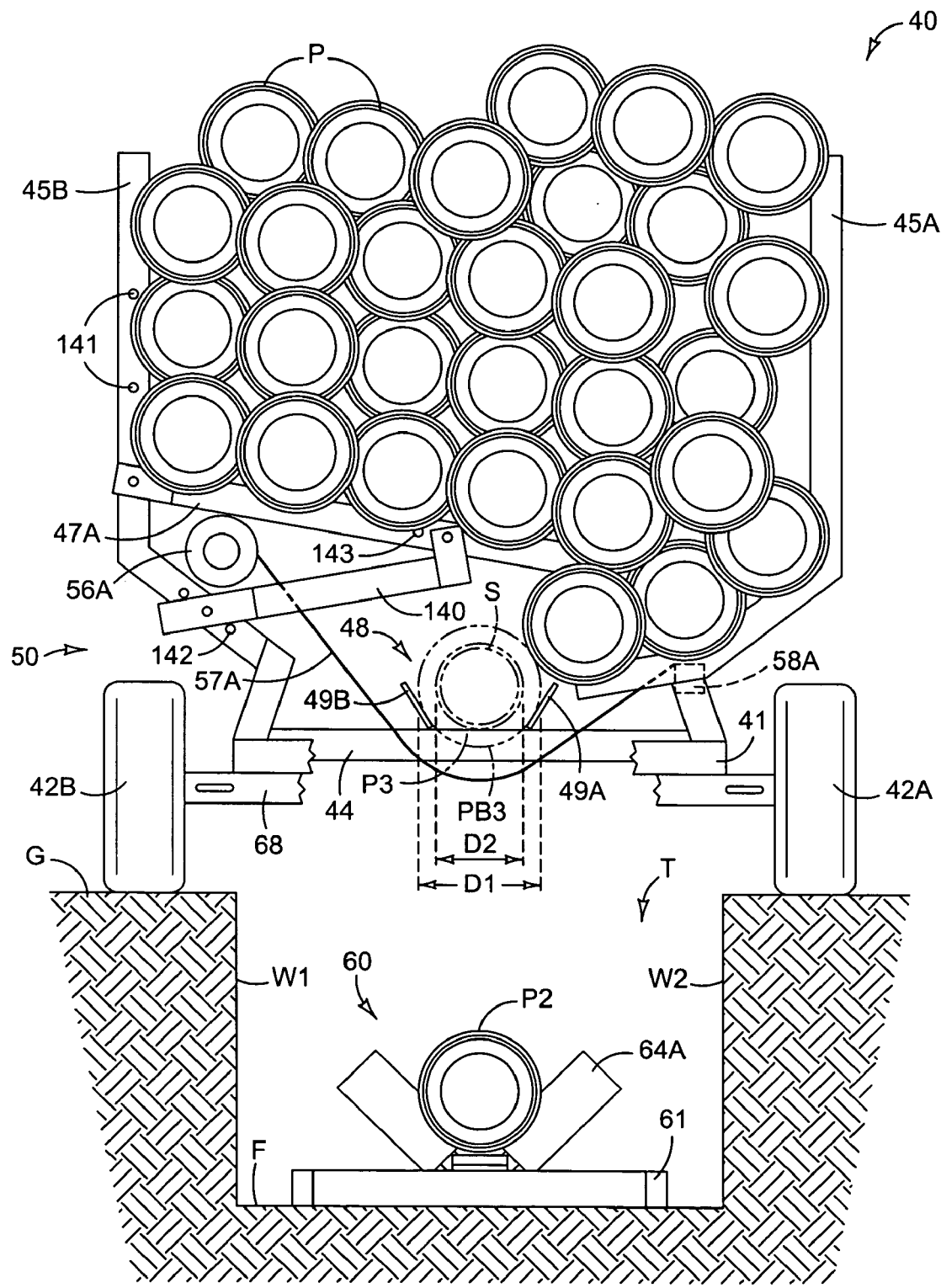
FIG. 7 is a schematic sectional representation depicting features of the pipe feed system and the pipe alignment system of an auto-advancing pipe installation device according to a preferred embodiment of the present invention.

Referring to FIGS. 1 through 7, auto-advancing pipe installation device 10 for laying consecutive lengths pipe in trench T is shown to advantage. As shown, in FIG. 7, auto-advancing pipe installation device 10 is positioned in the bottom of trench T. Trench T, in this instance has been previously excavated by an excavator, not shown, and as shown in FIG. 7, includes generally opposing sidewalls W1 and W2 and floor F. Referring to FIGS. 1 through 6, auto-advancing pipe installation device 10 includes locomotion system 20 connected to frame 15. Locomotion system 20 provides the motive force required for advancing auto-advancing pipe installation device 10 through trench T. Pipe supply system 40 is connected to frame 15 and is adapted to receive and hold one or more lengths of pipe P. Pipe feed system 50 feeds a single pipe length P3 to pipe alignment system 60 as required. Auto-advancing pipe installation device 10 also includes pipe alignment system 60 connected to frame 15 and positioned to receive a pipe length P3 from pipe feed system 50. As seen in FIG. 1 pipe alignment system 60 aligns pipe length P2 with a previously positioned pipe length P1. Auto-advancing pipe installation device 10 also includes pipe joining system 70 connected to frame 15 and adapted to displace pipe length P2 a predetermined distance along a longitudinal axis L of pipe length P2 against the previously laid pipe length P1. In the preferred embodiment of the invention, locomotion system 20 is adapted for advancing engagement with the trench T to motivate auto-advancing pipe installation device 10 through trench T.

Referring to FIGS. 2 through 6, pipe alignment system 60 includes alignment frame forward section 61 and alignment frame rearward section 62, which in the preferred embodiment is detachably connected to alignment frame forward section 61 with connection hardware 63 for transport. V-rollers 64A–64C and 64D, (shown in FIG. 1), are connected to alignment frame forward section 61 and alignment frame rearward section 62 and positioned at intervals to allow low-friction advance of pipe through pipe alignment system 60.

Figure 2:
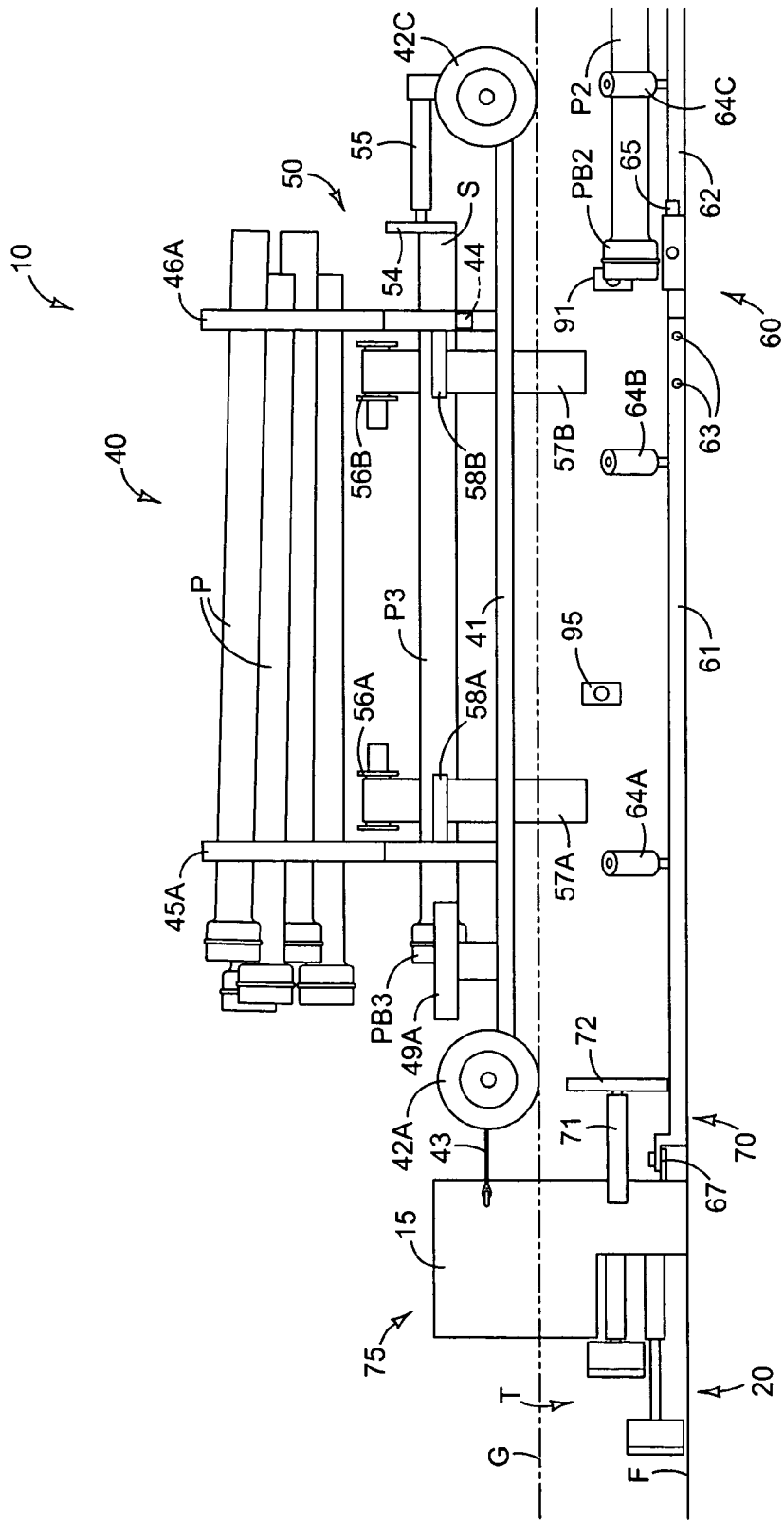
Figure 3:
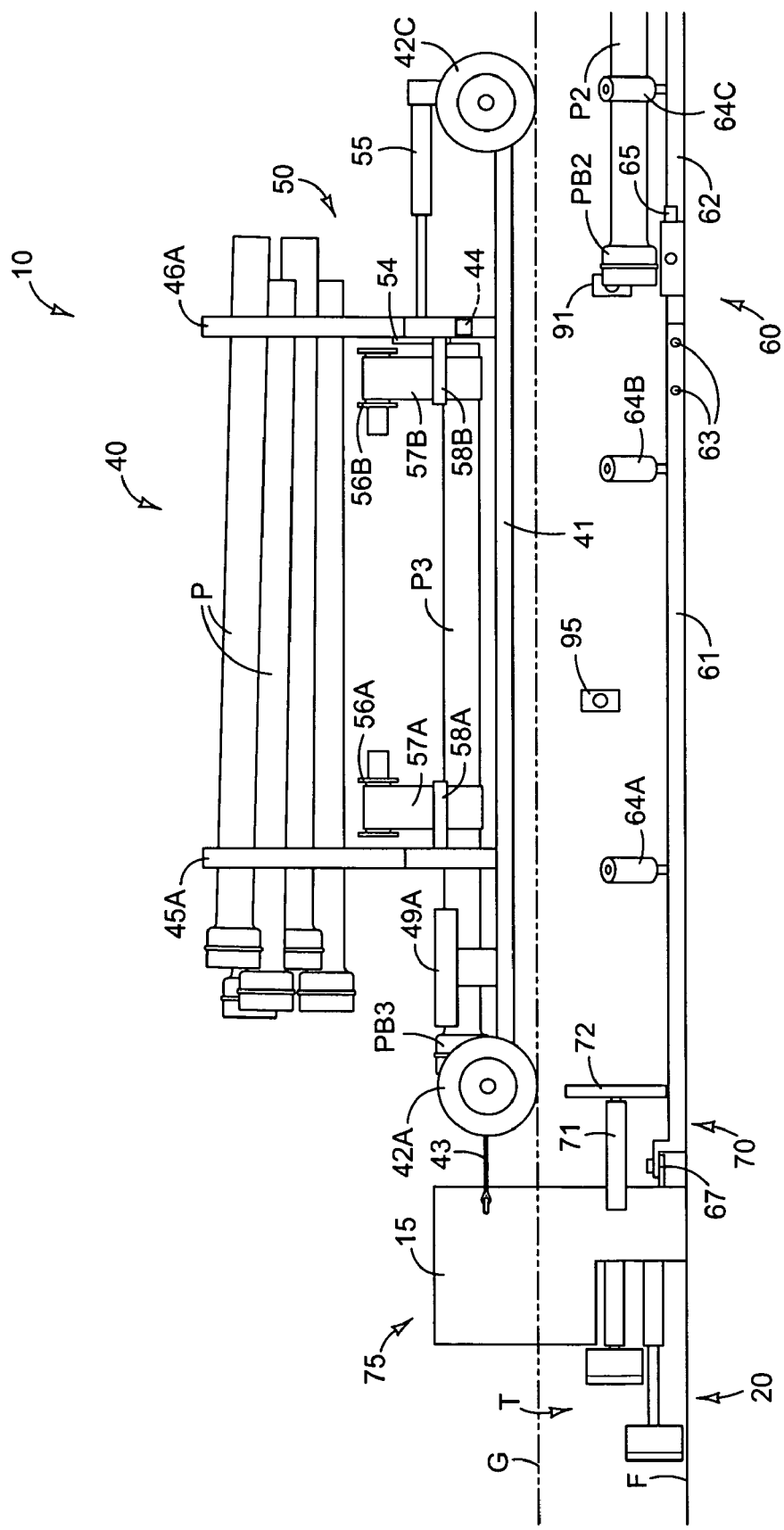
Figure 4:
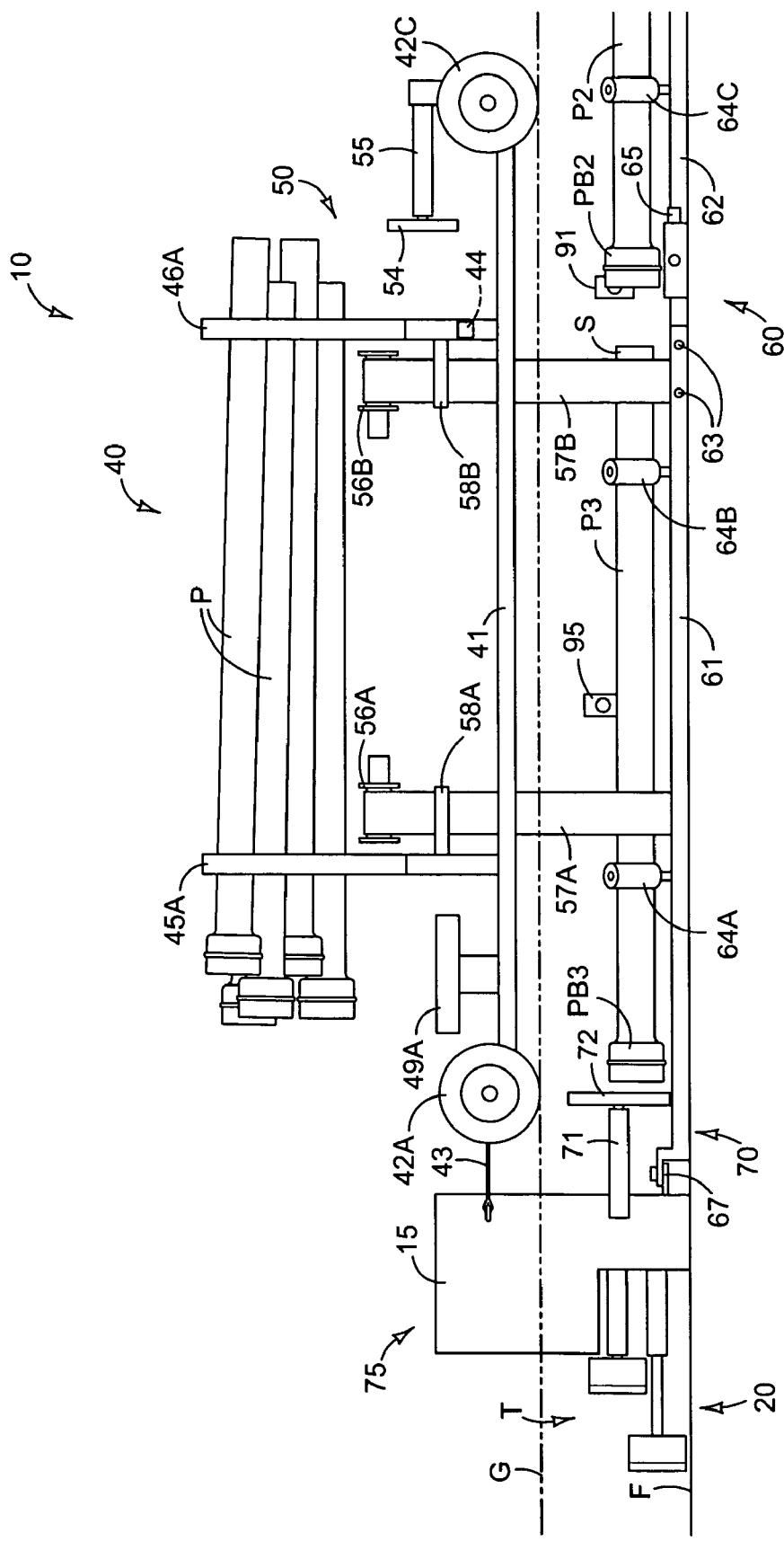

Referring to FIG. 1, as auto-advancing pipe installation device 10 advances along trench T, (as more fully discussed herein below), pipe lengths P1 and P2 pass over V-rollers 64A–64D, depositing to the rear of auto-advancing pipe installation device 10. Referring to FIGS. 2–6, as the end of pipe length P2 advances past pipe passage sensor 91, which provides input to control system 90 indicating that a pipe length is positioned so as to block pipe passage sensor 91 or in the alternative that a pipe length has passed pipe passage sensor 91. Bell restraint fork 65 pivots from a "down" position, as seen in FIG. 2–4, to an "up" position, as shown in FIG. 5, in response to input from pipe passage sensor 91 that a pipe length has passed pipe passage sensor 91. At the same time forward travel of auto-advancing pipe installation device 10 ceases as a pipe feeding sequence completes.

Figure 8:
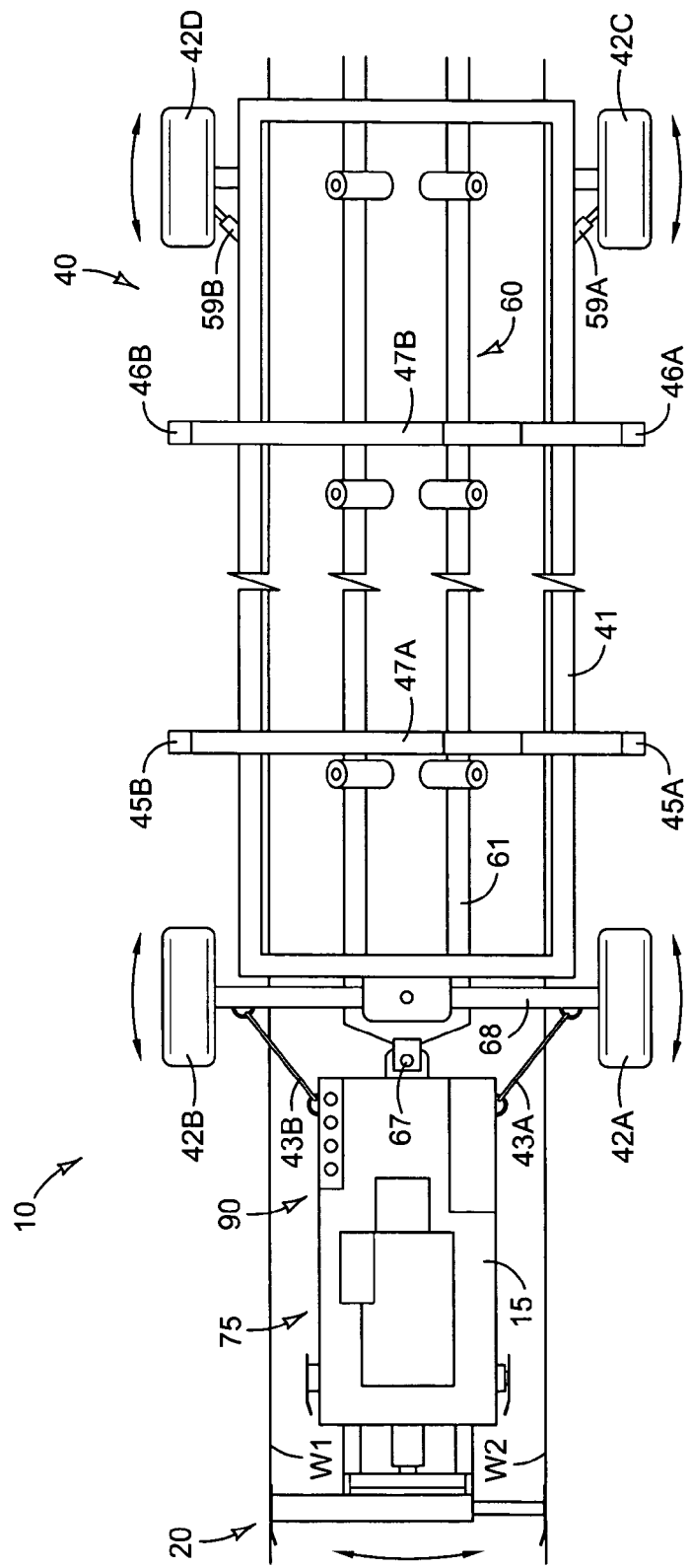
FIG. 8 is a schematic top view representation depicting select features of a preferred embodiment of the pipe feed system of an auto-advancing pipe installation device according to a preferred embodiment of the present invention.

Referring to FIG. 8, auto-advancing pipe installation device 10 is positioned as shown with respect to trench T. Locomotive system 20 is connected to frame 15 and is shown engaging sidewalls W1 and W2 of trench T. Frame 15 also supports power system 75 and control system 90. Pipe supply system 40 includes carriage 41 supported by four wheels, 42A–42D. Pipe supply system 40 is connected to frame 15 by a pair of arms 43A and 43B, which attach at their first ends to frame 15 and at their second ends to pivotable front axle 68. Rear wheels 42C and 42D are steerable by action of rear steering rams 59A and 59B. The fact that front wheels 42A and 42B and rear wheels 42C and 42D are steerable permitting pipe supply system 40 to track accurately behind frame 15 even though trench T may curve, as is often the case. FIG. 8 also shows alignment frame forward section 61 of pipe alignment system 60 attached to frame 15 by a universal connection 67, thereby permitting freedom of angular motion between frame 15 and pipe alignment system 60.

Referring to FIGS. 2 through 7, pipe supply system 40 is shown including two sets of generally opposing cradle arms, front cradle arms 45A and 45B, seen in FIGS. 7 and 8, and rear cradle arms 45C and 45D, seen in FIG. 8. Referring to FIGS. 7 and 8, front pipe translation bar 47A attaches to front cradle arm 45B and slopes in a manner such as to guide the supply of pipe P against front cradle arm 45A. As shown in FIG. 8, rear pipe translation bar 47B attaches to rear cradle arm 46B. Referring again to FIG. 7, it will be noted that front pipe translation bar 47A is adjustable to permit handling of various diameters of pipe. By connected ends of front pipe translation bar 47A at various apertures 141 a slope and a distance between a distal end of front pipe translation bar 47A and front cradle arm 45A may be varied. Similarly, by attaching the ends of support bar 140 at various first end apertures 142 and second end apertures 143 a slope and a distance between a distal end of front pipe translation bar 47A and front cradle arm 45A may be varied. The pair of front cradle arms 45A and 45B and their arrangement to one another and front pipe translation bar 47A is typical of the arrangement of the pair of rear cradle arms 46A and 46B, shown in FIG. 8, to one another and the rear pipe translation bar 47B.

Referring again to FIGS. 2 through 6, pipe feed system 50 includes a means for receiving and lowering a pipe length to pipe alignment system 60. In the preferred embodiment pipe feed system 50 includes first winch 56A and second winch 56B for raising and lowering first strap 57A and second strap 57B respectively. Referring to FIG. 7, pipe length P is gravity fed into pipe feed chute 48 with bell end PB3 of pipe length P3 supported by first bell keep/barrel guide plate 49A and second bell keep/barrel guide plate 49B and spigot end S of pipe length P3 supported by crossbar 44. Referring to FIGS. 2 and 3, as pipe feed ram 55 extends, push bar 54 contacts pipe length P3 and displaces pipe length P3 forward with respect to first bell keep/barrel guide plate 49A and second bell keep/barrel guide plate 49B, seen in FIG. 7, which initially supports bell end PB3. As pipe length P3 is pushed forward with respect to first bell keep/barrel guide plate 49A and second bell keep/barrel guide plate 49B, bell end PB3, having a diameter PBD, passes first bell keep/barrel guide plate 49A and second bell keep/barrel guide plate 49B and spigot end S, having a diameter D2, that is less than D1, falls between first bell keep/barrel guide plate 49A and second bell keep/barrel guide plate 49B. Spigot end S, shown in FIGS. 2 and 3, drops off of crossbar 44 and pipe length P3 is, at that point, supported by first strap 57A and second strap 57B.

As shown in FIGS. 2 and 3, first winch 56A and second winch 56B are, in the preferred embodiment, configured as a pair of hydraulically operated winches. As seen in FIG. 7, first strap 57A has a first end attached to first winch 56A and a second end attached to first strap tail hold 58A. Similarly, referring again to FIGS. 2 and 3, second strap 57B has a first end attached to second winch 56B and a second end attached to second strap tail hold 58B. When pipe feed ram 55 has traveled to an outer travel limit, operation of first winch 56A and second winch 56B is initiated and first strap 57A and second strap 57B begin to feed off first winch 56A and second winch 56B respectively at a controlled rate of feed. As pipe length P3 lowers it is eventually sensed by lowered pipe sensor 95 which provides input to control system 90 (FIG. 15) indicating that pipe length P3 has been lowered to a pre-selected elevation. First winch 56A and second winch 56B continue to feed first strap 57A and second strap 57B respectively for a pre-selected duration of time, assuring that pipe length P3 is lowered onto V-rollers 64A and 64B and feed first strap 57A and second strap 57B are positioned below and out of the way of pipe length P3 as shown in FIG. 3.

While the mechanism employed in the present embodiment as pipe feed system 50 for lowering a pipe length to pipe alignment system 60 is described as including a pair of retractable straps, other mechanisms or systems are to be considered within the scope of the present invention for accomplishing such function. For instance a mechanical, hydraulic, pneumatic or electrically operated elevator may be employed to lower a pipe length onto pipe alignment system 60. In practice it has been found however that the means described herein is suitable for handling a wide variety of pipe diameters as well as pipe manufactured from a wide variety of materials including various plastics and even cast iron.

Additionally, it should be noted that a pipe feed system for use with the present invention may take various forms and still be in keeping with the spirit of the present invention. For instance in certain situations, advancing a pipe supply system supported on a set of wheels may become difficult or ill advised, for instance where the condition of the terrain becomes extreme. In these instances a boom mounted to the frame of the auto-advancing pipe installation device 10 may pick and set single lengths of pipe into pipe alignment system 60. Alternately, pipe supply and feed systems may be adapted so as to be supported entirely by a frame that supports or otherwise contains the pipe alignment system as well. A pipe feed system may include two pairs of arms, each arm including a first end pivotally attached to a frame of the pipe alignment system 60 and a cross-member, for instance a sling, attaching each pair of arms near a second end each arm. The pair of arms selectively alternate between an up position and a down position by operation of an actuator. In an "up" position, a pipe length may be received onto the cross-member as discussed above, due to the action of a pipe feed ram that moves a pipe length from a first position wherein the pipe is supported by a pair of bell keep/barrel guide plates and a frame member, to a second position wherein the pipe is supported by cross-members that join each pair of arms. In a "down" position, the pair of arms pivot, positioning the pipe length on the V-rolls. Alternately, a pipe length may be manually positioned on the cross-members joining the pairs of arms, and subsequently positioned on the V-rolls by operation of the arms from the "up" position to the "down" position.

Auto-advancing pipe installation device 10 also includes pipe joining system 70, as shown in FIGS. 4 and 5, adapted to displace pipe length P3 a predetermined distance along a longitudinal axis L of pipe length P3 against the previously laid pipe length P2. As seen in FIGS. 2–6, auto-advancing pipe installation device 10 also includes bell restraint fork 65 which, as seen in FIG. 5, is positioned in an up position inhibiting passage of bell end PB of pipe length P2, and as seen in FIG. 6 is positioned in a down position permitting passage of joined pipe lengths P2 and P3. As pipe seating ram 71 extends, push bar 72 contacts pipe length P3, as seen in FIG. 5 and displaces pipe length P3 against pipe length P2. In the preferred embodiment, bell restraint fork 65 is positioned just behind a gasket race GR of the bell end PB2 as seen in FIG. 5. In the preferred embodiment, bell restraint fork 65 is adjustable to accept pipe of various diameters.

Referring to FIGS. 9 through 14 inclusive, the structure and operation of locomotion system 20 will be described. As shown, locomotion system 20 is mounted to frame 15 and as such frame 15 advances with advancement of locomotion system 20. Locomotion system 20 includes first travel ram 25 and second travel ram 26. First anchor ram 21 is connected to and movable with the extension and retraction of first travel ram 25. Similarly, second anchor ram 22 is connected to and movable with the extension and retraction of second travel ram 26. First anchor ram includes a pair of opposing side anchor plates 27A and 27B connected to and movable with opposing ends of first anchor ram 21. Similarly, second anchor ram 22 includes a second pair of opposing side anchor plates 28A and 28B that are connected to and movable with opposing ends of the second anchor ram 22. Lift ram 30 connects to frame 15 at connection 31 and to vertically slideable frame member 36 at connection 32. Foot 33 is attached to and extends below vertically slideable frame member 36. First travel ram 25 is connected to slideable frame member 34, which is attached to frame 15. Second travel ram 26 is connected to slideable frame member 35 which is attached to frame 15.

Referring to FIGS. 9–14, a discussion is offered illustrating one manner in which a locomotion system 20 may be adapted for advancing engagement within trench T. Referring to FIGS. 10A and 10B when first travel ram 25 is positioned at an inner limit of its travel, first anchor ram 21 retracts, second anchor ram 22 extends, and as seen in FIG. 10B, lift ram 30 extends, exerting a downward force on vertically slideable frame member 36, extending foot 33 which contacts floor F of trench T. At least a portion of the weight of frame 15 is borne by foot 33 and side anchor plates 28A and 28B. In some situations, for instance in shallow trenches or trenches having unstable soil conditions along an upper strata of the trench wall, side anchor plates 28A and 28B may be removed altogether and forward travel may be accomplished by engagement of foot 33 making contact with floor F of trench T followed by retraction of second travel ram 26. As seen in FIG. 10B, first travel ram 25 lifts with a forward portion of frame 15.

Figure 11A:
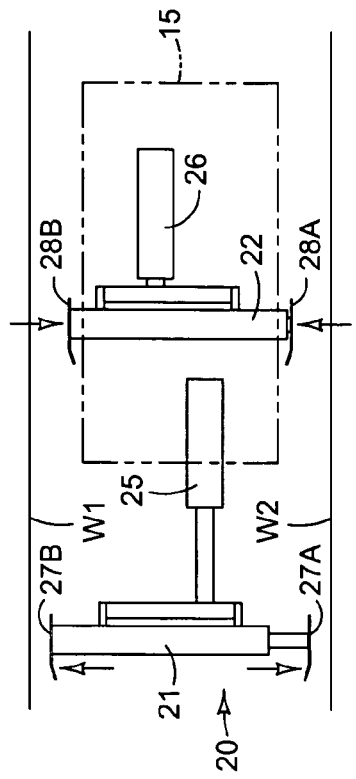
Figure 11B:
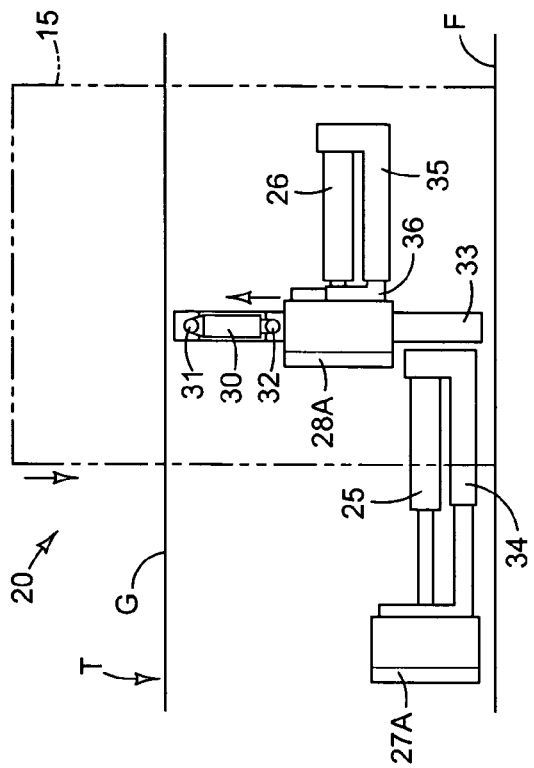
Figure 12A:
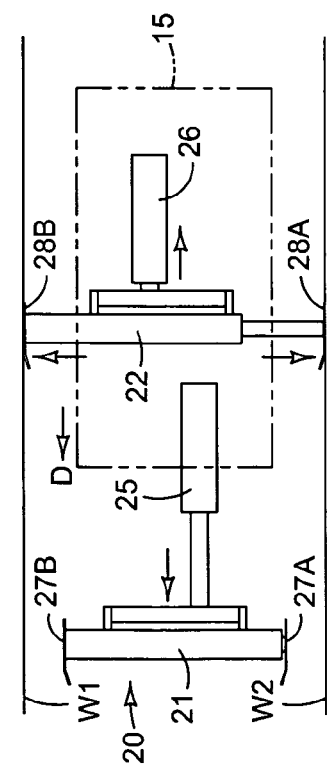
Figure 12B:
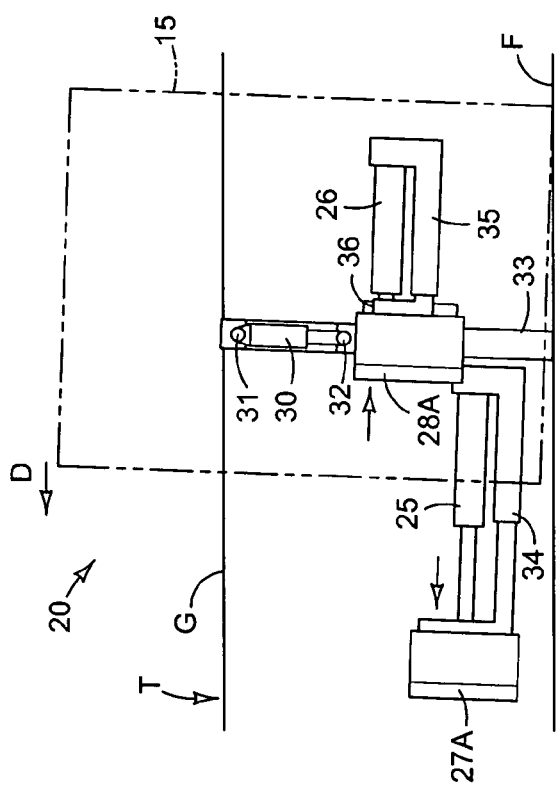

Referring to FIGS. 11A and 11B, with first anchor ram 21 retracted and side anchor plates 27A and 27B withdrawn from opposing sidewalls W1 and W2 of trench T, and with second anchor ram 22 extended with side anchor plates 28A and 28B in contact with sidewalls W1 and W2 of trench T, second travel ram 26 retracts advancing frame in direction D. Simultaneous to the retraction of second travel ram 26, first travel ram 25 extends. Referring to FIGS. 12A and 12B, once first travel ram 25 has extended and second travel ram 26 has retracted, first anchor ram 21 extends, second anchor ram 22 retracts and as seen in FIG. 12B lift ram 30 retracts.

Referring to FIGS. 13A and 13B, once first anchor ram 21 has extended and anchor plates 27A and 27B are in contact with sidewalls W1 and W2 of trench T and second anchor ram 22 and anchor ram 30 have retracted, first travel ram 25 retracts advancing frame in direction D. Simultaneous to the retraction of first travel ram 25, second travel ram 26 extends. Finally, referring to FIGS. 14A and 14B, once first travel ram 25 has retracted and second travel ram 26 has extended, first anchor ram 21 retracts, second anchor ram 22 extends and as seen in FIG. 14B lift ram 30 extends. The cycle described above with reference to FIGS. 9–14 repeats until suspended as discussed herein with pipe passage sensor 91, seen in FIGS. 2–6, providing input to control system 90 indicating that a pipe length has passed pipe passage sensor 91.

While the mechanism employed in the present embodiment as a locomotion system adapted for advancing engagement with the trench, other mechanisms or systems are to be considered within the scope of the present invention for accomplishing such function. For instance the locomotion system may include a single travel ram and a single anchor ram although not preferred as such a system would most likely be slower it may be in fact somewhat more simplified. Additionally, the pair of travel rams may be oriented differently than shown. Additionally, a tracked device, although most likely having greater power consumption requirements and being heavier and more costly to manufacture, may nonetheless be considered locomotion systems adapted for advancing engagement with the trench.

Figure 15:
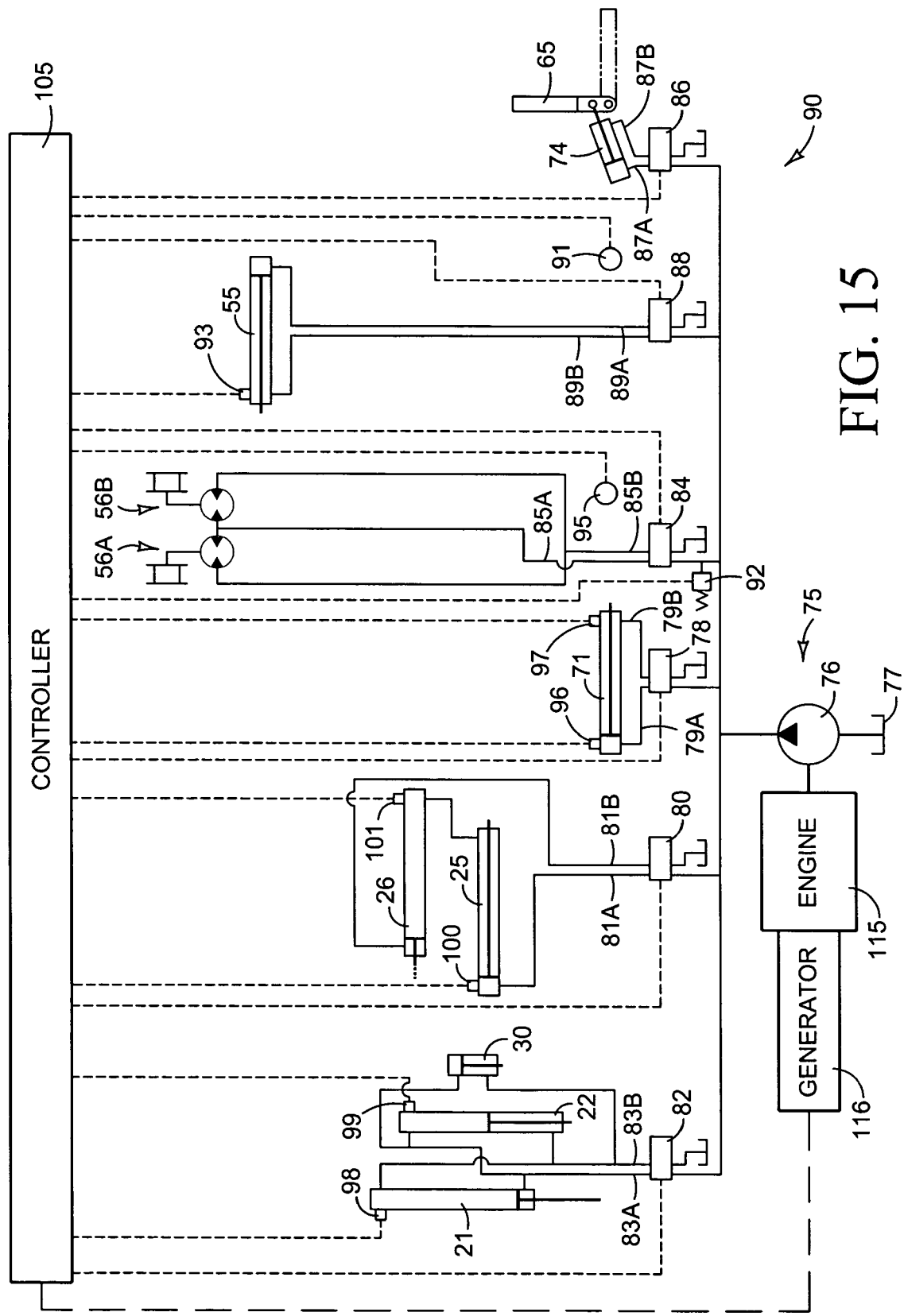
FIG. 15 is a representative schematic diagram showing features of the power system and the control system according to a preferred embodiment of the present invention.

Referring to FIG. 15, a representative schematic diagram is provided showing features of power system 75 and control system 90. In the preferred embodiment, power system 75 includes generator 116 and hydraulic pump 76 connected to engine 115. Hydraulic reservoir 77 is fluidly connected to hydraulic pump 76. Control system 90 includes the control valves, sensing devices and controller 105. Control system 90 may also include a remote control device, not shown, that permits an operator to control functions of the auto-advancing pipe installation device including "on-off", travel, stop, energize feed system, energize pipe joining system and "kill." As shown, control valve 80, a 3-position 4 way solenoid operated control valve, controls operation of first and second travel rams 25 and 26. Control valve 82, a 2-position solenoid operated control valve, controls operation of first anchor ram 21, second anchor ram 22 and lift ram 30. Control valve 84, a 2-position solenoid operated control valve, controls operation of first winch 56A and second winch 56B. Control valve 86, a 2-position solenoid operated control valve, controls operation of bell restraint ram 74. Control valve 88, a 2-position solenoid operated control valve, controls operation of pipe feed ram 55. Control valve 78, a 2-position solenoid operated control valve, controls operation of pipe seating ram 71.

Control system 90 includes pipe passage sensor 91 and lowered pipe sensor 95, both optical sensing device including a laser optical emitter, a reflector and an optical sensor. Pipe passage sensor 91 provides input to control system 90 indicating that a pipe length has advanced beyond pipe passage sensor 91. Lowered pipe sensor 95 provides input to control system 90 indicating the presence or absence of a pipe length positioned upstream of pipe passage sensor 91 in alignment frame forward section 61, as shown in FIGS. 2 and 3. Control system 90 also includes winch circuit pressure sensor 92 which provides input to control system 90 indicating that first strap 57A and second strap 57B have been rolled up onto first winch 56A and second winch 56B respectively to a pre-selected torque setting. Control system 90 also includes:

a) feed ram proximity sensor 93, which provides input to control system 90 indicating that pipe feed ram 55 has reached an outer limit of travel;

b) pipe seating ram inner proximity sensor 96, which provides input to control system 90 indicating that pipe seating ram 71 has reached an inner limit of travel;

c) pipe seating ram outer proximity sensor 96, which provides input to control system 90 indicating that pipe seating ram 71 has reached an outer limit of travel;

d) first anchor ram proximity sensor 98, which provides input to control system 90 indicating that first anchor ram 21 has reached an inner limit of travel, second anchor ram proximity sensor 99, which provides input to control system 90 indicating that second anchor ram 22 has reached an inner limit of travel;

e) first travel ram proximity sensor 100, which provides input to control system 90 indicating that first travel ram 25 has reached an inner limit of travel; and f) second travel ram proximity sensor 101, which provides input to control system 90 indicating that second travel ram 26 has reached an inner limit of travel.

Figure 16:
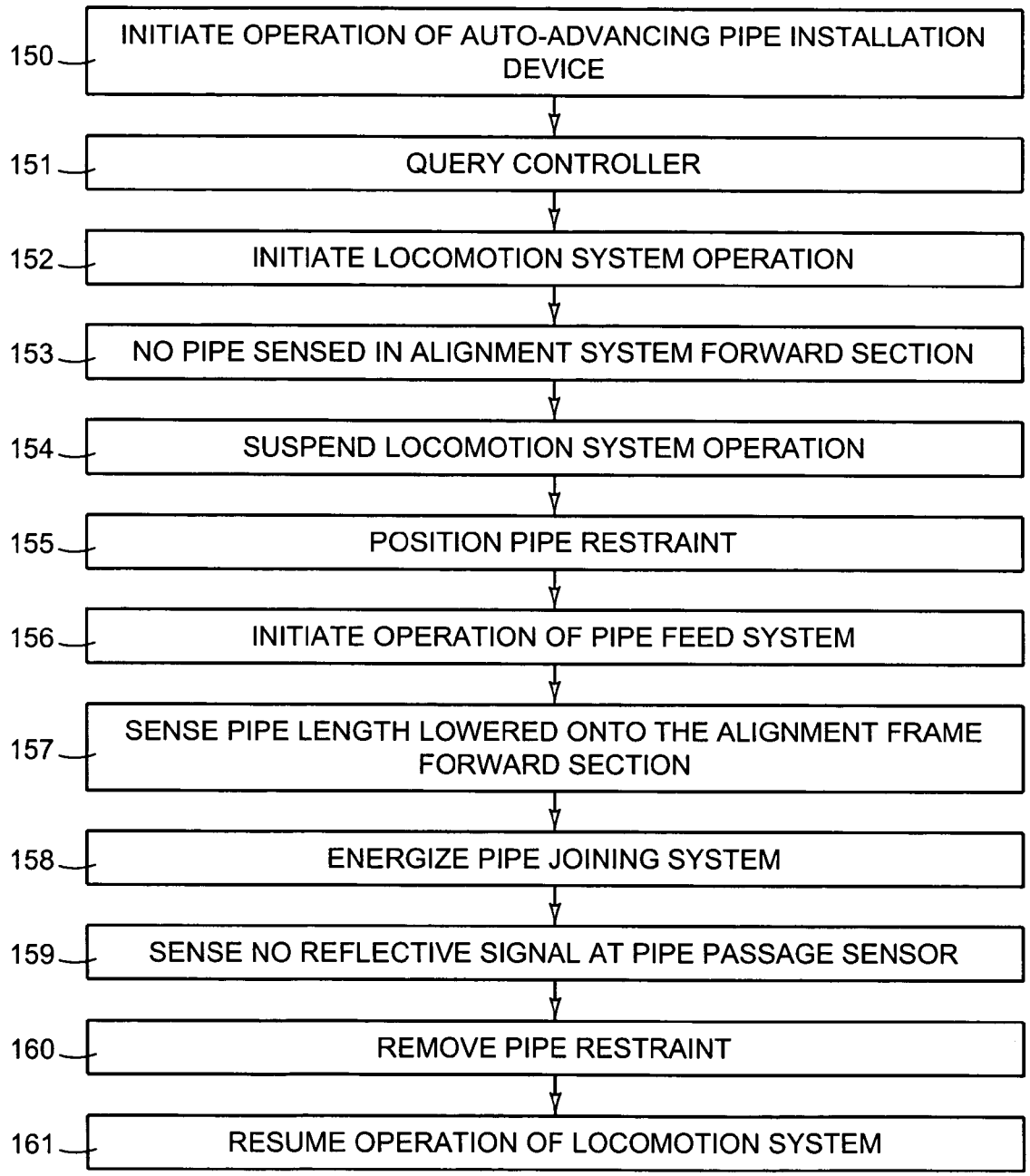
FIG. 16 is a schematic flow diagram showing the operation of an auto-advancing pipe installation device according to a preferred embodiment of the present invention.

Referring to FIG. 16, a schematic flow diagram depicts a flow or sequence of operation of auto-advancing pipe installation device 10. At step 150, INITIATE OPERATION OF AUTO-ADVANCING PIPE INSTALLATION DEVICE, operation of auto-advancing pipe installation device 10 is initiated. At step 151, QUERY CONTROLLER, system controller 105 queries to see determine that pipe passage sensor 91 does not sense a reflected signal indicating a pipe length is currently positioned upstream of pipe passage sensor 91, as shown in FIG. 6. Referring to FIG. 16, at step 152, INITIATE LOCOMOTION SYSTEM OPERATION, locomotion system 20, adapted for advancing engagement with trench T, initiates forward motion of auto-advancing pipe installation device 10 by engaging one or more surfaces forming the trench T in which auto-advancing pipe installation device 10 has been positioned. Referring to FIG. 16, at step 153, NO PIPE SENSED POSITIONED IN ALIGNMENT SYSTEM FORWARD SECTION, pipe passage sensor 91 senses a reflected signal indicating pipe length P2 has passed pipe passage sensor 91, as shown in FIG. 2. Referring to FIG. 16, at step 154, SUSPEND LOCOMOTION SYSTEM OPERATION, forward motion of auto-advancing pipe installation device 10 is suspended. At step 155, POSITION PIPE RESTRAINT, pipe length P2 positioned in a rearward section of the pipe alignment system is restrained against rearward movement. Referring to FIG. 16, at step 156, INITIATE OPERATION OF PIPE FEED SYSTEM, pipe feed system 50 positions pipe length P3 in alignment frame front section 61, as shown in FIG. 4. Referring to FIG. 16, at step 157, SENSE PIPE LENGTH LOWERED ONTO THE ALIGNMENT FRAME FORWARD SECTION, lowered pipe sensor 95 senses pipe length P3 lowered onto alignment frame front section 61, as shown in FIG. 4. Referring to FIG. 16, at step 158, ENERGIZE PIPE JOINING SYSTEM, pipe length P3 located on alignment frame front section 61 is joined to pipe length P3. Referring to FIG. 16, at step 159, SENSE NO REFLECTIVE SIGNAL AT PIPE PASSAGE SENSOR, pipe passage sensor 91 senses no reflective signal as pipe length P3 positioned on alignment frame front section 61 now blocks pipe passage sensor 91, as seen in FIG. 5. Referring to FIG. 16, at step 160, REMOVE PIPE RESTRAINT, the bell restraint fork 65 is removed from behind bell portion B pipe length P2, as shown in FIG. 6. Referring again to FIG. 16, at step 161 RESUME OPERATION OF LOCOMOTION SYSTEM, forward travel of auto-advancing pipe installation device 10 resumes, with joined pipe lengths P2 and P3 deposit to the rear of the auto-advancing pipe installation device 10, as shown in FIG. 6.

Figure 10A:
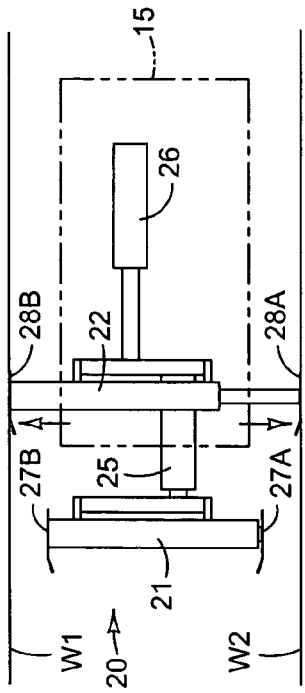
Figure 10B:
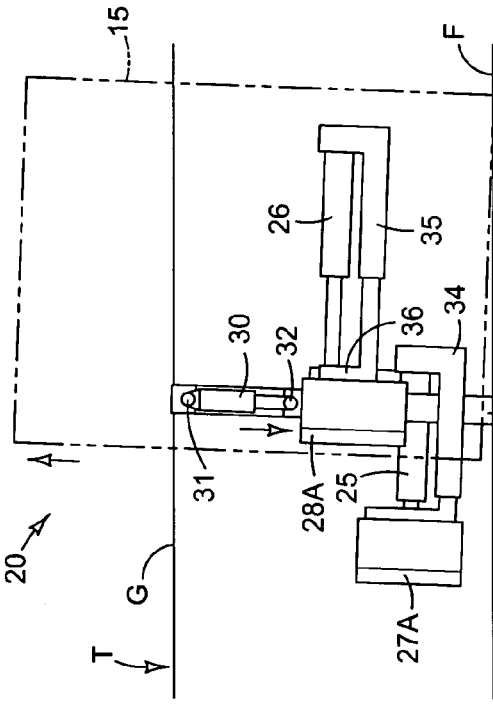
Figure 9A:
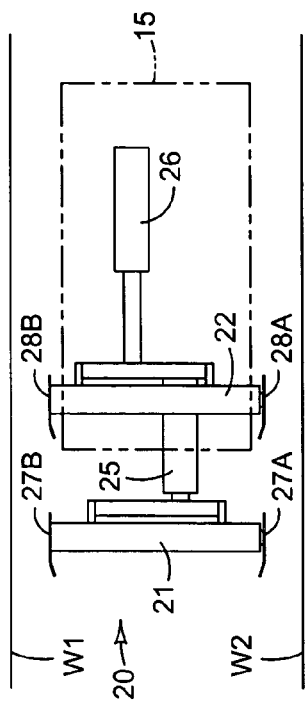
Figure 9B:
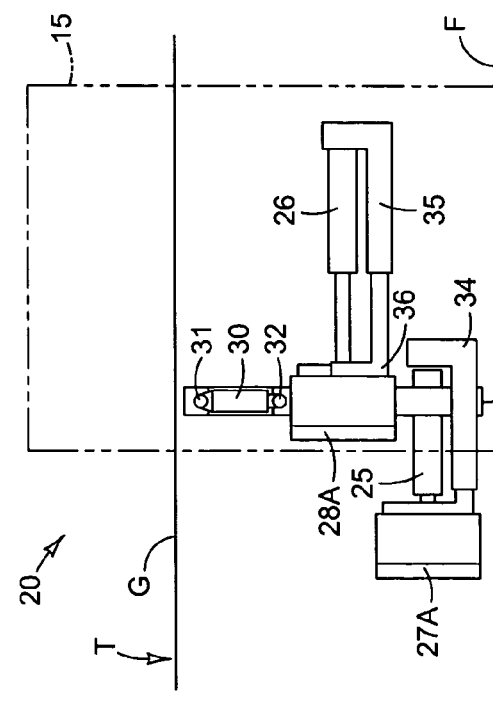
Figure 17A:
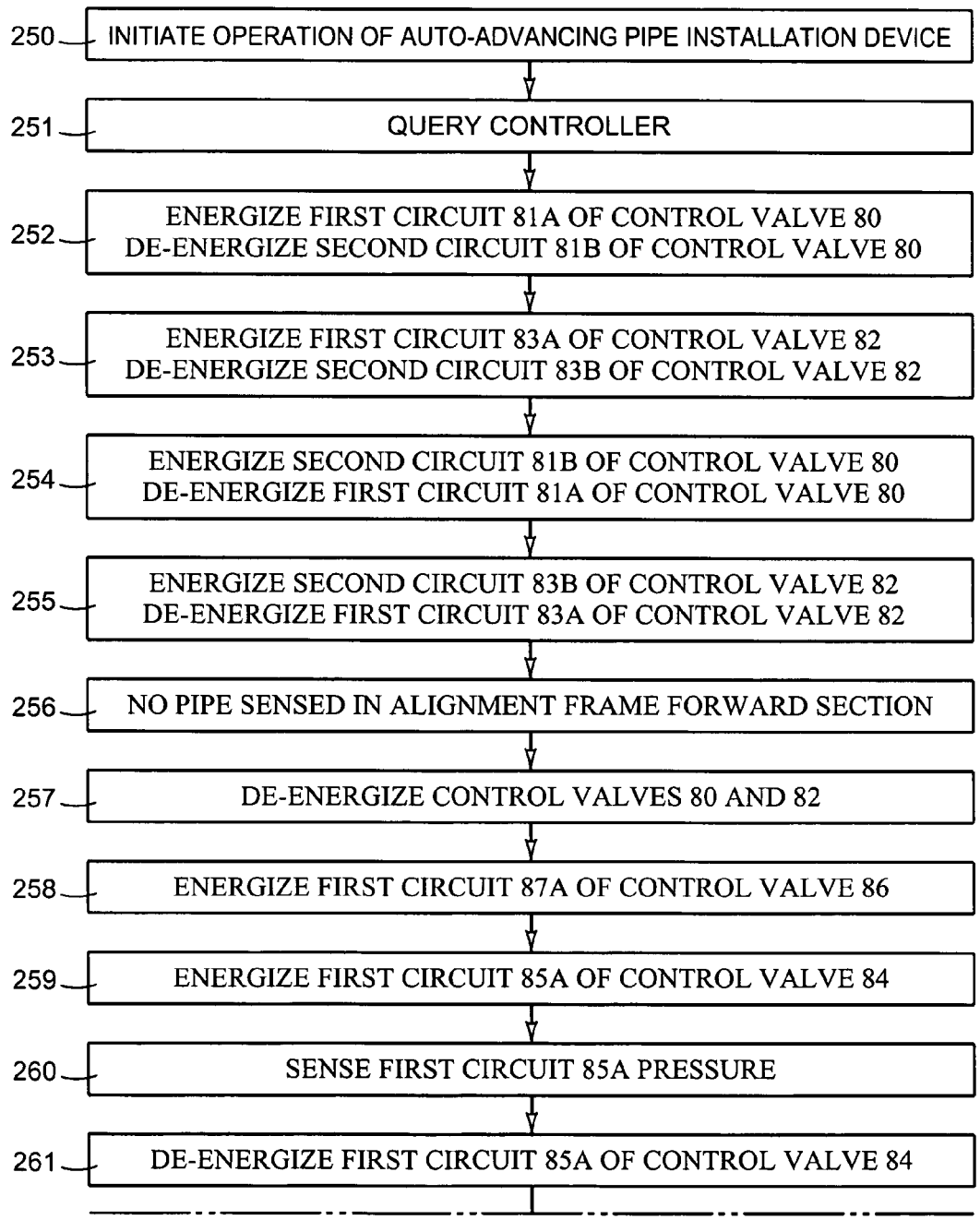
FIG. 17 is a schematic flow diagram showing the operation of an auto-advancing pipe installation device according to a preferred embodiment of the present invention.
Figure 17B:
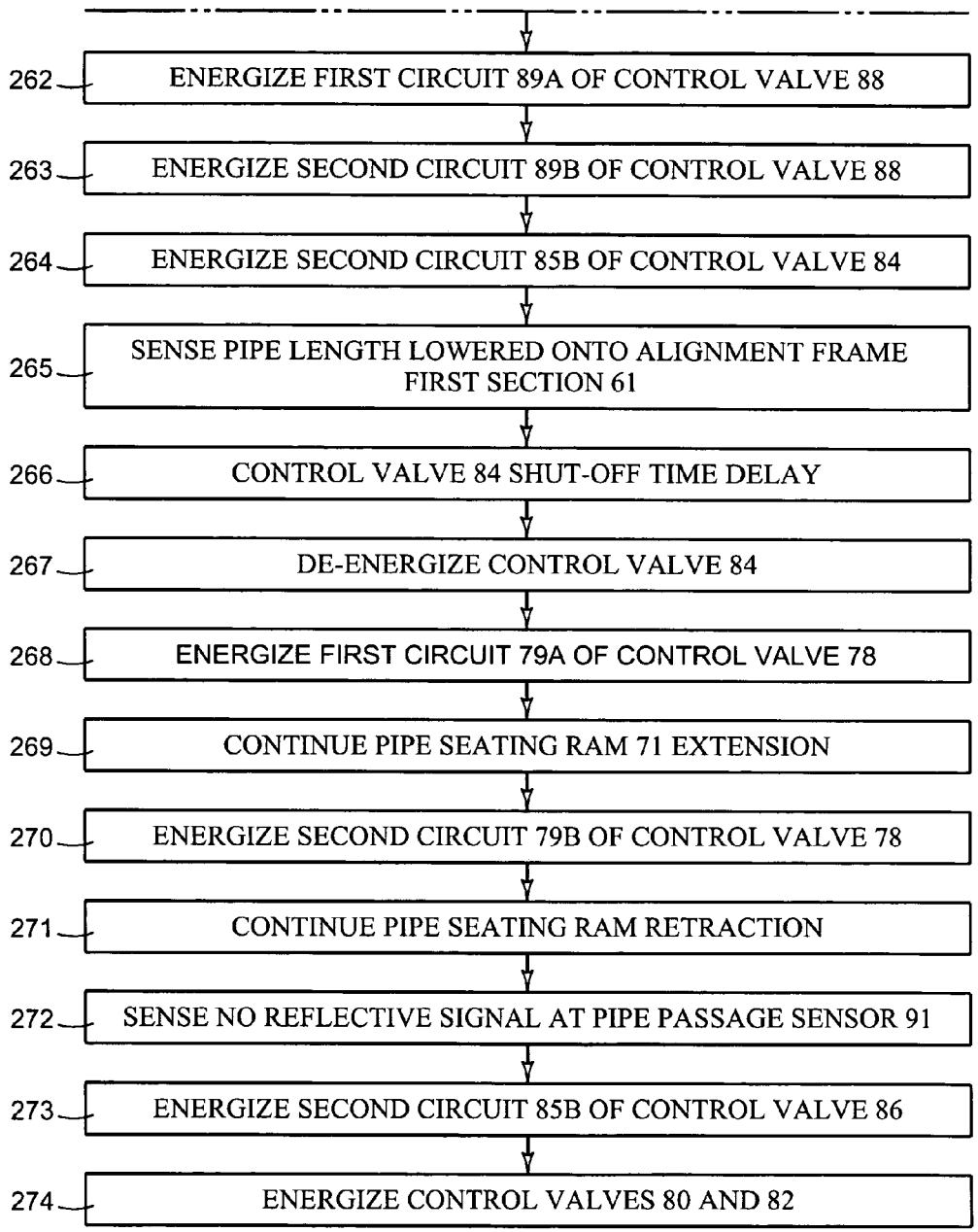

Referring to FIG. 17, a schematic flow diagram depicts a flow or sequence of operations of the preferred embodiment of the auto-advancing pipe installation device 10. At step 250, INITIATE OPERATION OF AUTO-ADVANCING PIPE INSTALLATION DEVICE, operation of auto-advancing pipe installation device 10 is initiated. At step 251, QUERY CONTROLLER, referring to FIG. 15, controller 105 queries to determine that pipe passage sensor 91 does not sense a reflected signal indicating a pipe length is currently positioned in alignment frame forward section 61. Controller 105 is also queried to determine positions of first and second travel rams 25 and 26 and first and second anchor rams 21 and 22. Assuming the query indicates that first and second travel rams 25 and 26 and first and second anchor rams 21 and 22 are positioned as shown in FIGS. 10A and 10B, at step 252, referring to FIG. 15, ENERGIZE FIRST CIRCUIT 81A OF CONTROL VALVE 80, DE-ENERGIZE SECOND CIRCUIT 81B OF CONTROL VALVE 80, first circuit 81A of control valve 80 is energized and first travel ram 25 extends releasing first travel ram proximity sensor 100 and second travel ram 26 retracts releasing second travel ram proximity sensor 101, as shown in FIGS. 11A and 11B. Referring again to FIG. 17, at step 253, ENERGIZE FIRST CIRCUIT 83A OF CONTROL VALVE 82, DE-ENERGIZE SECOND CIRCUIT 83B OF CONTROL VALVE 82, referring to FIG. 15, first circuit 83A of control valve 82 is energized causing first side anchor ram 21 to extend releasing first anchor ram proximity sensor 98, seen in FIG. 15, second side anchor ram 23 to retract tripping second anchor ram proximity sensor 99, seen in FIG. 15, and lift ram 30 to retract, as shown in FIGS. 12A and 12B. Referring again to FIG. 17, at step 254, ENERGIZE SECOND CIRCUIT 81B OF CONTROL VALVE 80, DE-ENERGIZE FIRST CIRCUIT 81A OF CONTROL VALVE 80, referring to FIG. 15, first circuit 81A of control valve 80 is de-energized and second circuit 81B of control valve 80 is energized causing second travel ram 26 to extend tripping second travel ram proximity sensor 101 and first travel ram 25 to retract, as shown in FIGS. 13A and 12B, releasing first travel ram proximity sensor 100, shown in FIG. 15. Referring again to FIG. 17, at step 255, ENERGIZE SECOND CIRCUIT 83B OF CONTROL VALVE 82, DE-ENERGIZE FIRST CIRCUIT 83A OF CONTROL VALVE 82, referring to FIG. 15, first circuit 83A of control valve 82 is de-energized and second circuit 83B of control valve 82 is energized causing first side anchor ram 21 to retract tripping first anchor ram proximity sensor 98, second side anchor ram 22 to extend releasing second anchor ram proximity sensor 99 and lift ram 30 to extend, as shown in FIG. 14B.

Steps 253–255 repeat continuously until pipe passage sensor 91 senses a reflective signal indicating the bell end of the pipe has passed pipe passage sensor 91.

Referring again to FIG. 17, at step 256, NO PIPE SENSED IN ALIGNMENT FRAME FORWARD SECTION, pipe passage sensor 91 senses a reflected signal indicating a pipe length is no longer positioned in upstream of pipe passage sensor 91, as seen in FIG. 6. Referring again to FIG. 17, at step 257, DE-ENERGIZE CONTROL VALVES 80 AND 82, referring to FIG. 15, control valves 80 and 82 are de-energized in response to the input from pipe passage sensor 91 that the pipe length has passed pipe passage sensor 91 and first and second travel rams 25 and 26 and first side anchor ram 21 and second side anchor ram 23 maintain positions.

Referring again to FIG. 17, at step 258, ENERGIZE FIRST CIRCUIT 87A OF CONTROL VALVE 86, referring to FIG. 15, first circuit 85A of control valve 86 is energized in response to the input from pipe passage sensor 91 that the pipe length has passed pipe passage sensor 91 and bell restraint ram 74 moves bell restraint fork 65 from a lowered position, as shown in FIG. 2, into an upright position, as shown in FIG. 5. At step 259, ENERGIZE FIRST CIRCUIT 85A OF CONTROL VALVE 84, referring to FIG. 15, first circuit 85A of control valve 84 is energized in response to the input from pipe passage sensor 91 that the pipe length has passed pipe passage sensor 91 causing first winch 56A and second winch 56B to actuate in a first rotational direction and, as shown in FIGS. 2 and 3, first and second straps 57A and 57B to retract. At step 260, referring to FIG. 17, SENSE FIRST CIRCUIT 85A PRESSURE, circuit is pressure sensor 92, shown in FIG. 15, senses that first and second straps 57A and 57B are fully retracted, as seen in FIG. 3. Referring again to FIG. 17, at step 261, DE-ENERGIZE FIRST CIRCUIT 85A OF CONTROL VALVE 84, referring to FIG. 15, first circuit 85A of control valve 84 is de-energized in response to the input from circuit pressure sensor 92 that first and second straps 57A and 57B are fully retracted, as shown in FIG. 3. At step 262, ENERGIZE FIRST CIRCUIT 89A OF CONTROL VALVE 88, referring to FIG. 15, first circuit 89A of control valve 88 is energized in response to the input from circuit pressure sensor 92 that first and second straps 57A and 57B are fully retracted causing pipe feed ram 55 to extend, as shown in FIG. 4, tripping proximity sensor 93. Referring again to FIG. 17, at step 263, ENERGIZE SECOND CIRCUIT 89B OF CONTROL VALVE 88, referring to FIG. 15, second circuit 89B of control valve 88 is energized in response to input from proximity sensor 93 that pipe feed ram 55 has reached the outer limit of it travel and, as shown in FIG. 4, pipe feed ram 55 retracts releasing feed ram proximity sensor 93.

Referring again to FIG. 17, at step 264, ENERGIZE SECOND CIRCUIT 85B OF CONTROL VALVE 84, referring to FIG. 15, second circuit 85B of control valve 84 is energized in response to input from proximity sensor 93 that pipe feed ram 55 has reached the outer limit of it travel and first winch 56A and second winch 56B are actuated in a second rotational direction so that first and second straps 57A and 57B begin extension, lowering pipe length P3 as seen in FIG. 4. Referring again to FIG. 17, at step 265, SENSE PIPE LENGTH LOWERED ONTO ALIGNMENT FRAME FORWARD SECTION 61, referring to FIG. 15, lowered pipe sensor 95 senses pipe length lowered onto alignment frame forward section 61 as seen in FIG. 4. Referring again to FIG. 17, at step 266, CONTROL VALVE 84 SHUT-OFF TIME DELAY, a pre-selected time delay is initiated in response to input from lowered pipe sensor 95 that a pipe length has been lowered onto alignment frame forward section 61, allowing first winch 56A and second winch 56B additional time in which first and second straps 57A and 57B may be fed out sufficiently to become completely free of the pipe length as seen in FIG. 5. Referring again to FIG. 17, at step 267, DE-ENERGIZE CONTROL VALVE 84, referring to FIG. 15, second circuit 85B of control valve 84 is de-energized in response to input that the time delay has passed from the time lowered pipe sensor 95 sensed the presence that a pipe length has been lowered onto alignment frame forward section 61, as seen in FIG. 4.

At step 268, ENERGIZE FIRST CIRCUIT 79A OF CONTROL VALVE 78, referring to FIG. 15, first circuit 79A of control valve 78 is energized in response to input from lowered pipe sensor 95 that a pipe length has been lowered onto alignment frame forward section 61 extending pipe seating ram 71 and releasing pipe seating ram inner proximity sensor 96. At step 269, CONTINUE PIPE SEATING RAM 71 EXTENSION, referring to FIG. 15, pipe seating ram 71 continues to extend tripping pipe seating ram outer proximity sensor 97. At step 270, ENERGIZE SECOND CIRCUIT 79B OF CONTROL VALVE 78, referring to FIG. 15, second circuit 79B of control valve 78 is energized in response to input from outer proximity sensor 97 that pipe seating ram 71 has reached an outer limit of travel, retracting pipe seating ram 71 and releasing pipe seating ram outer proximity sensor 97. At this point, spigot end S of pipe length P3 has been inserted a pre-selected distance into pipe bell end PB of pipe length P2 as seen in FIG. 5. Referring again to FIG. 17, at step 271, CONTINUE PIPE SEATING RAM RETRACTION, referring to FIG. 15, pipe seating ram 71 continues to retract tripping pipe seating ram inner proximity sensor 96. At step 272, SENSE NO REFLECTIVE SIGNAL AT PIPE PASSAGE SENSOR 91, referring to FIG. 15, pipe passage sensor 91 senses no reflective signal as pipe length P3 now blocks pipe passage sensor 91 as seen in FIG. 5.

Referring again to FIG. 17, at step 273, ENERGIZE SECOND CIRCUIT 87B OF CONTROL VALVE 86, referring to FIG. 15, second circuit 87B of control valve 86 is energized in response to the input from pipe seating ram inner proximity sensor 96 that pipe seating ram 71 has reached an inner limit of travel, and bell restraint ram 74 moves bell restraint fork 65 from the upright position shown in FIG. 5, into the down position shown in FIG. 6, wherein bell restraint fork 65 is removed from behind bell portion PB2 of pipe length P2, so that when forward motion of the auto-advancing pipe installation device 10 is resumed, the joined pipe lengths P2 and P3 will deposit to the rear of the auto-advancing pipe installation device 10 as shown in FIG. 6. Referring again to FIG. 17, at step 274, ENERGIZE CONTROL VALVES 80 AND 82, referring to FIG. 15, control valves 80 and 82 are energized in response to the input from pipe seating ram inner proximity sensor 96 that pipe seating ram 71 has reached an inner limit of travel, and first and second travel rams 25 and 26 resume travel sequence at a point in the travel sequence at which travel was suspended.

Figure 18:
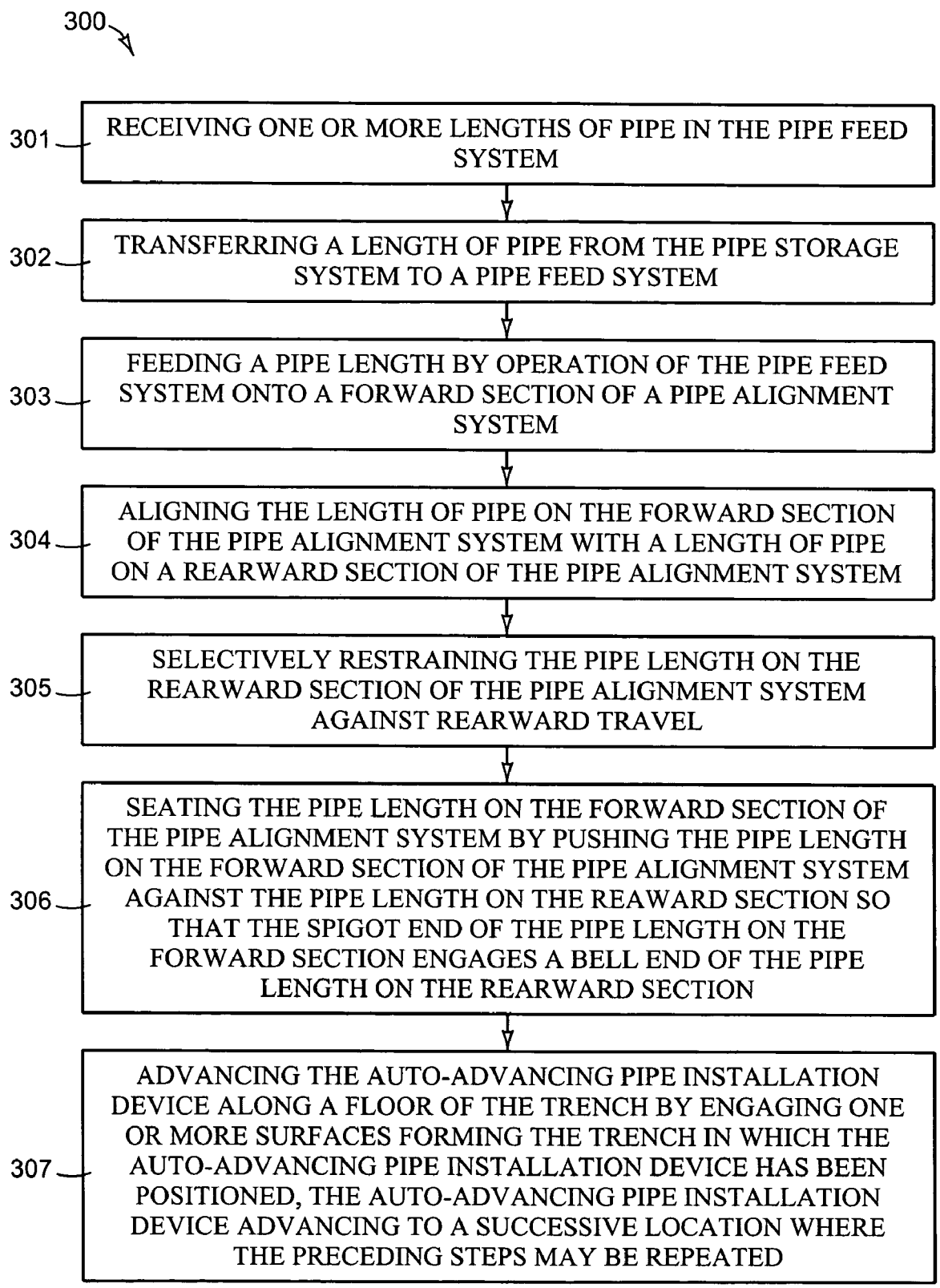
FIG. 18 is a schematic flow diagram showing the steps of a method for laying and joining consecutive lengths of bell and spigot pipe employing an automatic pipe installation device according to one embodiment of the present invention.

FIG. 18 is a schematic flow diagram depicting the steps of a METHOD FOR LAYING AND JOINING CONSECUTIVE LENGTHS OF PIPE 300. The method employs an automatic pipe installation device including a frame, a locomotion system, a pipe feed system, a pipe alignment system and a pipe joining system all connected to the frame. The method for laying and joining consecutive lengths of pipe 300 includes the steps of receiving one or more lengths of pipe in a pipe storage system 301, transferring a length of pipe from the pipe storage system to a pipe feed system 302, feeding a pipe length by operation of the pipe feed system onto a forward section of a pipe alignment system 303, aligning the pipe length on the forward section of the pipe alignment system with a pipe length on a rearward section of the pipe alignment system 304, selectively restraining the pipe length on the rearward section of the pipe alignment system against rearward travel 305, seating the pipe length on the forward section of the pipe alignment system by pushing the pipe length on the forward section of the pipe alignment system against the pipe length on the rearward section so that a spigot end of the pipe length on the forward section engages a bell end of the pipe length on the rearward section 306, and advancing the auto-advancing pipe installation device along a floor of the trench by advancingly engaging one or more surfaces forming the trench in which auto-advancing pipe installation device has been positioned, the auto-advancing pipe installation device advancing to a successive location where the preceding steps may be repeated 307.

While this invention has been described with reference to the detailed embodiments, this description is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. An auto-advancing pipe installation device for installing sequential lengths of pipe in a trench, the device comprising:
    a frame;
    a locomotion system connected to the frame, the locomotion system including a first travel ram connected to the frame, the first travel ram adapted for linear extension and retraction in a line substantially parallel to a direction of travel of the auto-advancing pipe installation device, a first anchor ram connected to and movable with the extension and retraction of the first travel ram, the first anchor ram including a first pair of opposing side anchor plates connected to and movable with opposing ends of the first anchor ram, the first anchor ram adapted for linear extension upon completion of the linear extension of the first travel ram the first anchor ram adapted for linear retraction upon completion of linear retraction of the first ram;
    a pipe feed system connected to the frame;
    a pipe alignment system connected to the frame, the pipe alignment system positioned to receive a forward pipe length from the pipe feed system onto a pipe alignment system forward section, the pipe alignment system adapted to align the forward pipe length with a rearward pipe length positioned in a pipe alignment system rearward section; and
    a pipe joining system connected to the pipe alignment system, the pipe joining system adapted to join the forward pipe length to the rearward pipe length.

2. The auto-advancing pipe installation device of claim 1 further comprising:
    a power system adapted to provide power for auto-advancing pipe installation device; and
    a control system adapted to control the locomotion system, the pipe feed system, the pipe restraint and the pipe joining system.

3. The auto-advancing pipe installation device of claim 1 further comprising:
    a pipe restraint connected to the pipe alignment system, the pipe restraint adapted to selectively apply a restraining force against the rearward pipe length; and
    the pipe joining system connected to the pipe alignment system, the pipe joining system adapted to apply a force to a first end of the forward pipe length substantially parallel to a longitudinal axis of the forward pipe length, joining the forward pipe length to a restrained rearward pipe length.

4. The auto-advancing pipe installation device of claim 1 wherein the locomotion system further comprises:
    a second travel ram connected to the frame, the second travel ram adapted for linear extension and retraction in a line substantially parallel to a direction of travel of the auto-advancing pipe installation device, the second travel ram adapted for a simultaneous opposing linear retraction with respect to the linear extension of the first travel ram, and the second travel ram also adapted for simultaneous opposing linear extension with respect to the linear retraction of the first travel ram;
    a second anchor ram connected to and movable with the extension and retraction of the second travel ram, the second anchor ram including a second pair of opposing side anchor plates connected to and movable with opposing ends of the second anchor ram;
    the first anchor ram adapted for extension upon completion of the linear extension of the first travel ram and the first anchor ram adapted for retraction upon completion of the linear retraction of the first travel ram; and
    the second anchor ram adapted for extension upon completion of the linear extension of the second travel ram and the second anchor ram adapted for retraction upon completion of the linear retraction of the second travel ram.

5. The auto-advancing pipe installation device of claim 4 wherein the locomotion system further comprises a lift ram adapted to extend with the extension of the second anchor ram.

6. The auto-advancing pipe installation device of claim 1 wherein the pipe alignment system further comprises a first plurality of V-rolls attached to the alignment frame forward section and a second plurality of V-rolls attached to the alignment frame rearward section, the second plurality of V-rolls adapted to hold a forward pipe length and the first plurality of V-rolls adapted to hold a rearward pipe length in a substantially co-axial alignment with the longitudinal axis of the forward pipe length.

7. The auto-advancing pipe installation device of claim 1 further comprises a pipe supply system connected to the frame, the pipe supply system including a plurality of arms adapted to hold a supply of pipe, a pipe feed chute adapted to receive a single pipe length from the plurality of arms and a pipe fed ram adapted to translate the single pipe length received in the pipe feed chute from a first position wherein the pipe is supported in the pipe feed chute to a second position wherein the pipe is supported by the pipe feed system.

8. The auto-advancing pipe installation device of claim 1 wherein the pipe joining system further comprises a pipe seating ram adapted to exert a force to an end of a pipe length positioned in the pipe alignment system forward section, the force substantially parallel to the longitudinal axis of the pipe length positioned in the pipe alignment system forward section.

9. An auto-advancing pipe installation device for laying consecutive lengths pipe in a trench, the trench including two generally opposing sidewalls and a floor, the pipe installation device comprising:
    a frame;
    a locomotion system connected to the frame, the locomotion system adapted to advanceingly engage one or more trench surfaces selected from a group of trench surfaces including the two generally opposing trench sidewalls and the trench floor;
    a pipe alignment system connected to the frame, a pipe feed system connected to the frame;
the pipe alignment system positioned to receive a forward pipe length from the pipe feed system onto a pipe alignment system forward section, the pipe alignment system adapted to align the forward pipe length with a rearward pipe length positioned in a pipe alignment system rearward section;
a pipe restraint connected to the pipe alignment system, the pipe restraint adapted to selectively apply a restraining force against the rearward pipe length;
a pipe joining system connected to the pipe alignment system, the pipe joining system adapted to apply a force to a first end of the forward pipe length substantially parallel to a longitudinal axis of the forward pipe length, joining the forward pipe length to a restrained rearward pipe length;
a power system adapted to provide power for auto-advancing pipe installation device; and
a control system adapted to control the locomotion system, the pipe feed system, the pipe restraint and the pipe joining system.

10. The auto-advancing pipe installation device of claim 9 wherein the locomotion system further comprises:
a first travel ram connected to the frame, the first travel ram adapted for linear extension and retraction in a line substantially parallel to a direction of travel of the auto-advancing pipe installation device;
a first anchor ram connected to and movable with the extension and retraction of the first travel ram, the first anchor ram including a first pair of opposing side anchor plates connected to and movable with opposing ends of the first anchor ram, the first anchor ram adapted for linear extension upon completion of the linear extension of the first travel ram; and
the first anchor ram adapted for linear retraction upon completion of linear retraction of the first ram.

11. The auto-advancing pipe installation device of claim 9 wherein the locomotion system further comprises:
first travel ram connected to the frame, the first travel ram adapted for linear extension and retraction in a line substantially parallel to a direction of travel of the auto-advancing pipe installation device;
a second travel ram connected to the frame, the second travel ram adapted for linear extension and retraction in a line substantially parallel to a direction of travel of the auto-advancing pipe installation device, the second travel ram adapted for a simultaneous opposing linear retraction with respect to the linear extension of the first travel ram, and the second travel ram also adapted for simultaneous opposing linear extension with respect to the linear retraction of the first travel ram;
a first anchor ram connected to and movable with the extension and retraction of the first travel ram, the first anchor ram including a first pair of opposing side anchor plates connected to and movable with opposing ends of the first anchor ram;
a second anchor ram connected to and movable with the extension and retraction of the second travel ram, the second anchor ram including a second pair of opposing side anchor plates connected to and movable with opposing ends of the second anchor ram;
the first anchor ram adapted for extension upon completion of the linear extension of the first travel ram and the first anchor ram adapted for retraction upon completion of the linear retraction of the first travel ram; and the second anchor ram adapted for extension upon completion of the linear extension of the second travel ram and the second anchor ram adapted for retraction upon completion of the linear retraction of the second travel ram.

12. The auto-advancing pipe installation device of claim 11 wherein the locomotion system further comprises a lift ram including a foot, the lift ram adapted to extend upon extension of the second anchor ram.

13. The auto-advancing pipe installation device of claim 9 wherein the pipe alignment system further comprises a first plurality of V-rolls attached to the alignment frame forward section and a second plurality of V-rolls attached to the alignment frame rearward section, the second plurality of V-rolls adapted to hold a forward pipe length and the first plurality of V-rolls adapted to hold a rearward pipe length in a substantially co-axial alignment with the longitudinal axis of the forward pipe length.

14. The auto-advancing pipe installation device of claim 9 further comprises a pipe supply system connected to the frame, the pipe supply system including a plurality of arms adapted to hold a supply of pipe, a pipe feed chute adapted to receive a single pipe length from the plurality of arms and a pipe fed ram adapted to translate the single pipe length received in the pipe feed chute from a first position wherein the pipe is supported in the pipe feed chute to a second position wherein the pipe is supported by the pipe feed system.

15. A method for laying and joining consecutive lengths of bell and spigot pipe employing an automatic pipe installation device including a locomotion system, a pipe joining system, a pipe alignment system and a pipe feed system connected to the frame, the method for laying and joining consecutive lengths of bell and spigot pipe includes the steps of:
feeding a pipe length onto a forward section of the pipe alignment system;
aligning the pipe length on the forward section of the pipe alignment system with a pipe length on a rearward section of the pipe alignment system;
selectively restraining the pipe length on the rearward section of the pipe alignment system from rearward travel;
seating the pipe length on the forward section of the pipe alignment system by pushing the pipe length on the forward section of the pipe alignment system against the pipe length on the rearward section of the pipe alignment system so that the spigot end of the pipe length on the forward section engages a bell end of the pipe length on a rearward section; and advancing the pipe installation device along a floor of the trench by advancingly engaging one or more surfaces forming the trench in which auto-advancing pipe installation device has been positioned, the pipe installation device advancing to a successive location where the preceding steps may be repeated.

16. The method for laying and joining consecutive lengths of bell and spigot pipe of claim 15 further including the steps of:
receiving one or more lengths of pipe in a pipe storage bay of a pipe storage system; and
feeding a pipe length from the pipe storage bay onto a forward section of a pipe alignment system.

* * * * *